(12) United States Patent
Murakami et al.

(10) Patent No.: US 8,270,334 B2
(45) Date of Patent: Sep. 18, 2012

(54) PARAMETER SETTING CHANGE METHOD AND SETTING APPARATUS

(75) Inventors: Akiko Murakami, Kawasaki (JP); Yuji Tazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 627 days.

(21) Appl. No.: 12/409,575

(22) Filed: Mar. 24, 2009

(65) Prior Publication Data

US 2009/0245156 A1  Oct. 1, 2009

(30) Foreign Application Priority Data

Mar. 25, 2008  (JP) .................. 2008-076902

(51) Int. Cl.
*H04H 20/71* (2008.01)

(52) U.S. Cl. ...................... 370/312; 370/315

(58) Field of Classification Search .......... 370/312, 370/328, 252, 232, 389, 349, 390, 401, 432, 370/392, 338, 471, 516, 270, 315
See application file for complete search history.

(56) References Cited

U.S. PATENT DOCUMENTS

| | | | | |
|---|---|---|---|---|
| 7,463,578 B2 * | 12/2008 | Iwamura et al. | ............ | 370/216 |
| 2002/0003798 A1 | 1/2002 | Sato et al. | | |

FOREIGN PATENT DOCUMENTS

| | | |
|---|---|---|
| JP | 2001-320324 A | 11/2001 |
| JP | 2001-345807 A | 12/2001 |
| JP | 2002-077249 | 3/2002 |
| JP | 2004-165794 | 6/2004 |
| JP | 2005-033548 | 2/2005 |
| JP | 2006-180414 | 7/2006 |
| WO | WO-02/17574 A1 | 2/2002 |
| WO | WO-2005/027394 A1 | 3/2005 |
| WO | WO-2005-099188 A1 | 10/2005 |
| WO | WO-2007/029745 A1 | 3/2007 |
| WO | WO-2008-020729 A1 | 2/2008 |

OTHER PUBLICATIONS

Japanese Office Action mailed Jun. 19, 2012 for corresponding Japanese Application No. 2008-076902, with English-language translation.

\* cited by examiner

*Primary Examiner* — Chi Pham
*Assistant Examiner* — Alexander O Boakye
(74) *Attorney, Agent, or Firm* — Fujitsu Patent Center

(57) ABSTRACT

A parameter setting change method for a system that performs multicast distribution from an information distribution apparatus to a plurality of mobile stations via a relay node is provided. In the method, a parameter adjustment setting apparatus analyzes a data reception state output from the plurality of mobile stations and calculates an information-distribution-apparatus setting-change parameter and a relay-node setting-change parameter for making the data reception state within a predetermined range. Then, when the information distribution apparatus can be set to the information-distribution-apparatus setting-change parameter, the relay node performs setting change to the relay-node setting-change parameter.

14 Claims, 32 Drawing Sheets

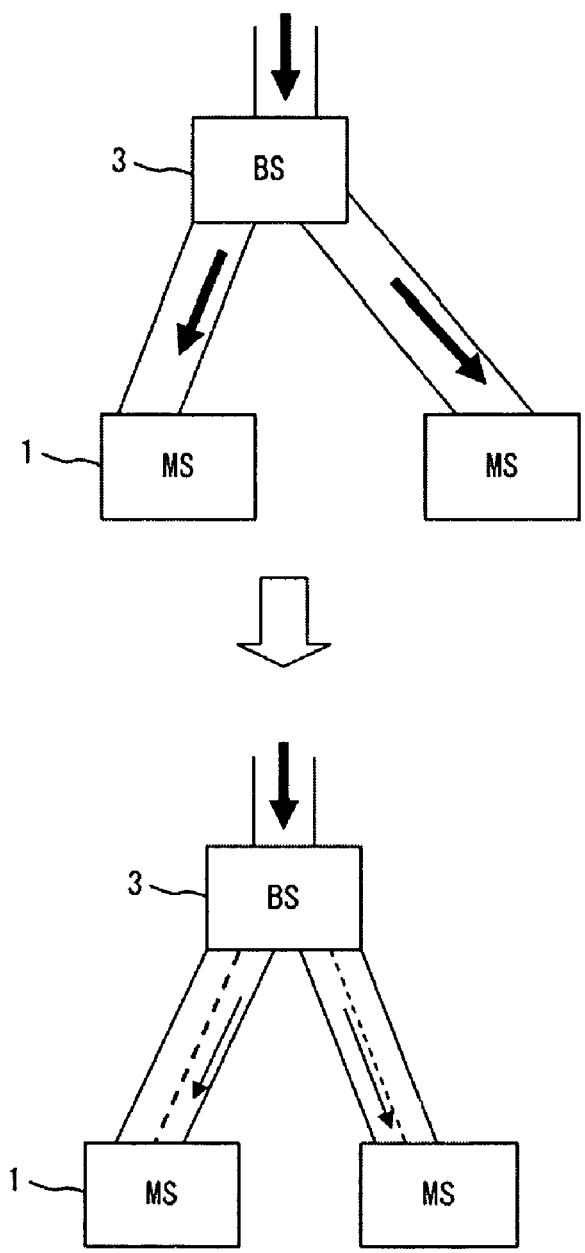
F I G. 5

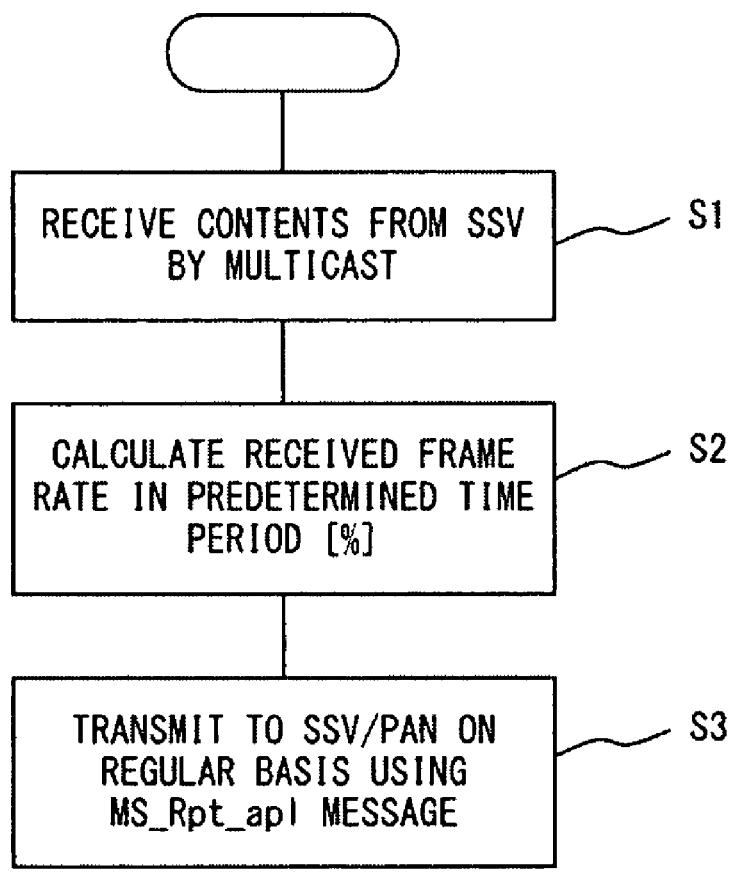
F I G. 7

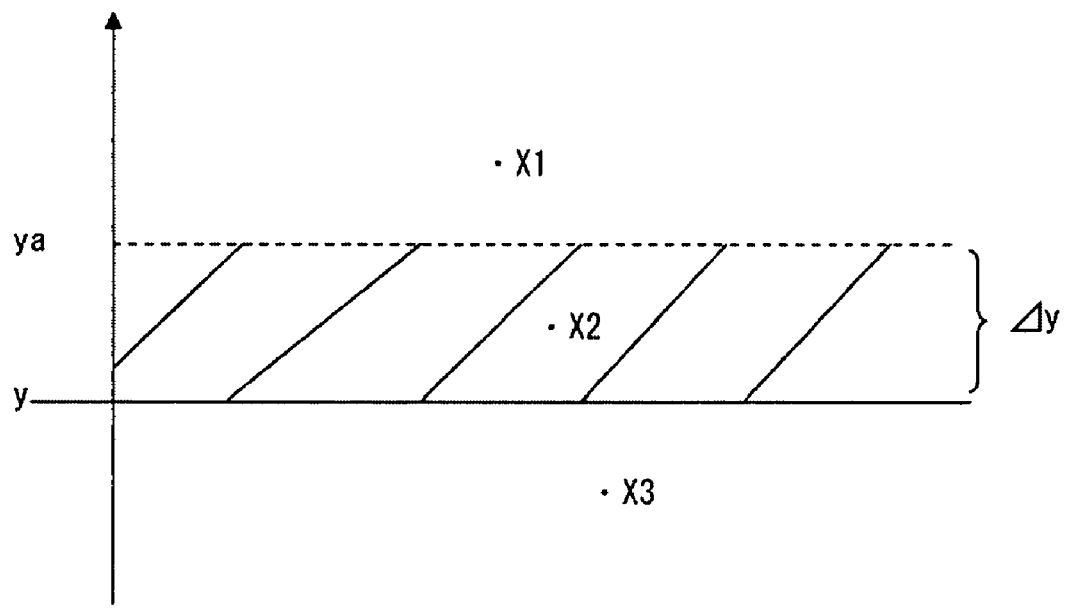
F I G. 1 3

HIGHER QUALITY →

| AMOUNT OF CHANGE IN RECEPTION RATE | Codec | SIZE [pixels] | AVERAGE RATE [bps] | BANDWIDTH [bps] | PRIORITY [diffserv] | MODULATION METHOD | ENCODING RATE |
|---|---|---|---|---|---|---|---|
| 0.05 | MPEG2 | 1024 × 768 | 5M | 6M | EF | 64QAM | 3/4 |
| 0.05 | MPEG2 | 1024 × 768 | 5M | 6M | EF | 64QAM | 2/3 |
| 0.05 | MPEG2 | 1024 × 768 | 5M | 6M | EF | 64QAM | 1/2 |
| 0.05 | MPEG2 | 1024 × 768 | 5M | 6M | AF41 | 16QAM | 3/4 |
| 0.05 | MPEG2 | 1024 × 768 | 5M | 6M | AF31 | 16QAM | 2/3 |
| 0.05 | MPEG2 | 1024 × 768 | 5M | 6M | AF21 | 16QAM | 1/2 |
| 0.05 | MPEG2 | 640 × 480 | 5M | 1M | AF21 | QPSK | 3/4 |
| 0.05 | MPEG1 | 640 × 480 | 1M | 600K | AF11 | QPSK | 2/3 |
| 0.05 | MPEG4 | 160 × 120 | 500K | 300K | AF11 | QPSK | 1/2 |
| 0.05 | MPEG4 | 160 × 120 | 200K | 300K | AF11 | QPSK | 1/2 |

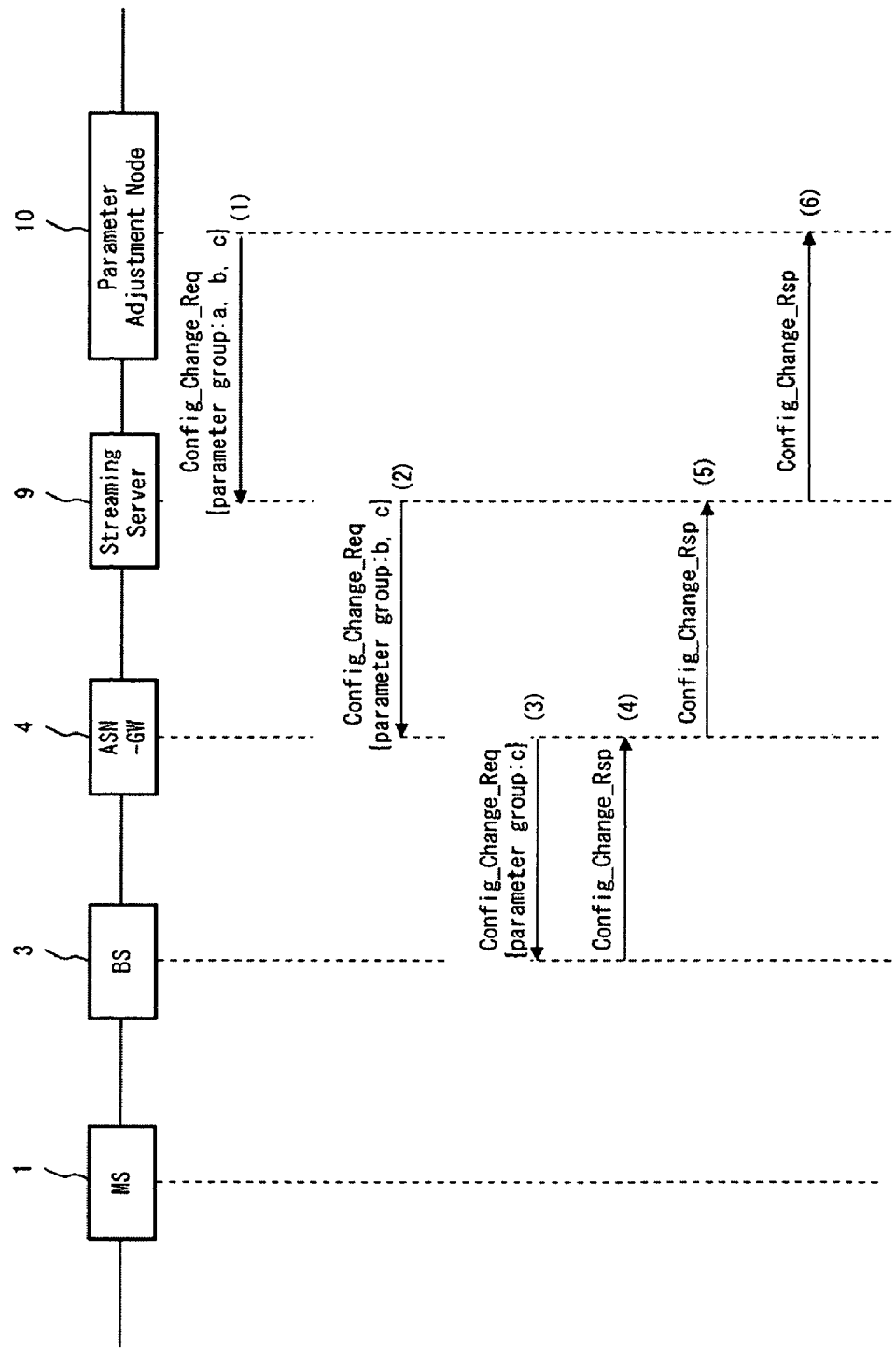
F I G. 27

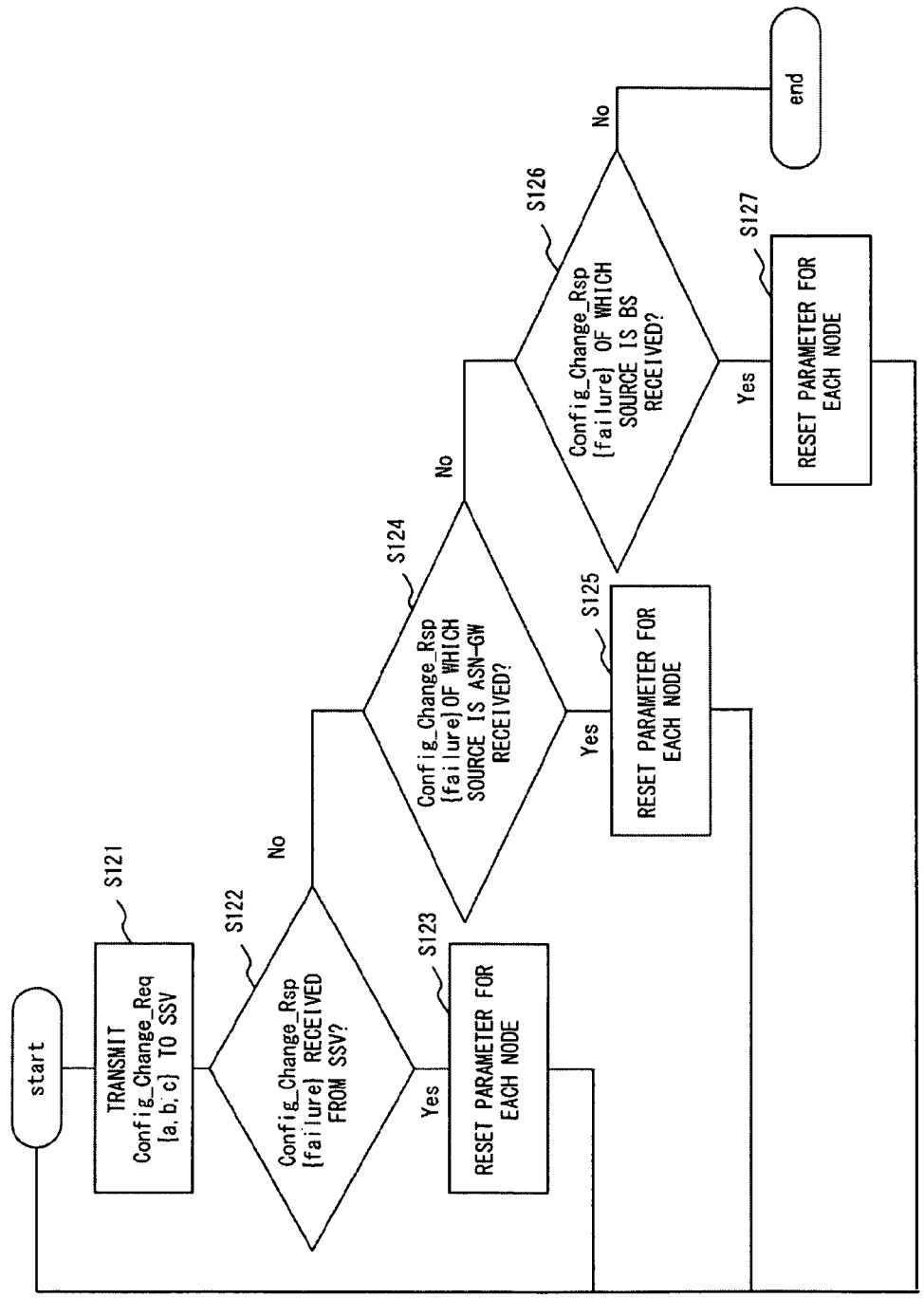
F I G. 28

PARAMETER SETTING CHANGE METHOD AND SETTING APPARATUS

CROSS-REFERENCE TO RELATED APPLICATION

This application is based upon and claims the benefit of priority of the prior Japanese Patent Application No. 2008-076902, filed on Mar. 25, 2008, the entire contents of which are incorporated herein by reference.

FIELD

The present invention relates to a parameter setting change method and a parameter setting apparatus. The parameter may be used in a multicast distribution system.

BACKGROUND

WiMAX (Worldwide Interoperability for Microwave Access) system is one of mobile communication systems. FIG. 1 is a diagram illustrating the outline of WiMAX system. The system realizes the mobile communication service by combining the layer-3 mobility technique (mobile IP) and the layer-2 mobility technique based on the IEEE 802.16e technology. WiMAX system consists of three types of nodes: a mobile station (MS) 1, an access service network (ASN) 2, and a connectivity service network (CSN) 5. The ASN 2 consists of a base station (BS) 3 and an ASN gateway (ASN-GW) 4.

Each of the nodes performs communication via a reference point that is defined by WiMAX Forum. For example, the ASN 2 communicates with the mobile station 1 via a reference point defined by R1, and communicates with CSN 5 via a reference point defined by R3. When there are a plurality of ASN gateways 4, one of the ASN gateways 4 communicate with another ASN gateway 4 via a reference point defined by R4. The base station 3 and the ASN gateways 4 perform communication via a reference point defined by R6.

MCBCS (Multicast Broadcast service) is a multicast distribution services used in WiMAX system. FIG. 2 is a diagram illustrating MCBCS. According to MCBCS, contents 7 are distributed from a contents server 6 to a plurality of mobile stations 1 in an MCBCS zone 8, via the ASN gateway 4 and the base station 3.

Some systems other than WiMAX system have been disclosed in which data including stream data are distributed from a transmitting station to a plurality of receiving terminals via a communication network. Patent Document 1 (Japanese Patent Application Publication No. 2001-345807) discloses a system including a repeating node that acquires information receiving condition data sent from a each of connected receiving terminals or repeating node under control to an incoming line, and periodically sends, to the high-order relay node or transmitting station, information obtained by statistically-processing the information receiving condition data. Patent Document 2 (Japanese Patent Application Publication No. 2001-320324) discloses a system in which an information distributing device distributes the same multicast information in accordance with a plurality of different transmission conditions, and a radio terminal receives the multicast information distributed in accordance with one of the transmission conditions.

MCBCS mentioned above involves data distribution only in the downlink direction. For this reason, a contents server 6 or a mobile station 3 are not to be informed that the service could not be provided appropriately for the mobile station 1a, even if a reception error occurs in a mobile station 1a due to a geographic condition and so on. Therefore, the multicast distribution cannot be performed effectively, since the setting cannot be changed so that the mobile station 1a can receive the data, as well as mobile stations 1b, 1c, 1d and 1e in which data reception can be performed.

According to Patent Document 1, the data distribution condition between each relay node and the mobile station 1 is basically changed individually, requiring time before the bandwidth is efficiently set between the transmitting station and the terminal.

Meanwhile, according to the system described in Patent Document 2, the base station changes the transmission condition to the terminal experiencing a reception error, in accordance with the reception state in the receiving terminal. However, in the system, the setting of the bandwidth to be used between the server and the base station cannot be changed. Therefore, the bandwidth between the transmitting station to the terminal cannot be used efficiently.

SUMMARY

According to an aspect of the invention, a parameter setting change method is provided. The method is a parameter setting change method for a system that performs multicast distribution from an information distribution apparatus to a plurality of mobile stations via a relay node includes a parameter adjustment setting apparatus analyzing a data reception state output from the plurality of mobile stations and calculating an information-distribution-apparatus setting-change parameter and a relay-node setting-change parameter for making the data reception state within a predetermined range; and the relay node performing setting change to the relay-node setting-change parameter, when the information distribution apparatus can be set to the information-distribution-apparatus setting-change parameter.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 5 is a diagram illustrating an example of advantages in distributing emergency contents in the embodiment.

FIG. 7 is a flowchart of the feedback at the application level performed by the mobile station.

FIG. 13 is a diagram illustrating the relationship between the reception rate and the acceptable reception rate range.

FIG. 15 is a diagram describing an example of the setting change table stored in the parameter adjustment node.

FIG. 27 is a sequence diagram illustrating the process in which each node is set to setting-change parameters in the system according to embodiment (4).

FIG. 28 is a flowchart describing the operations performed by the parameter adjustment node in the system according to embodiment (4).

DESCRIPTION OF EMBODIMENTS

Figure 1:
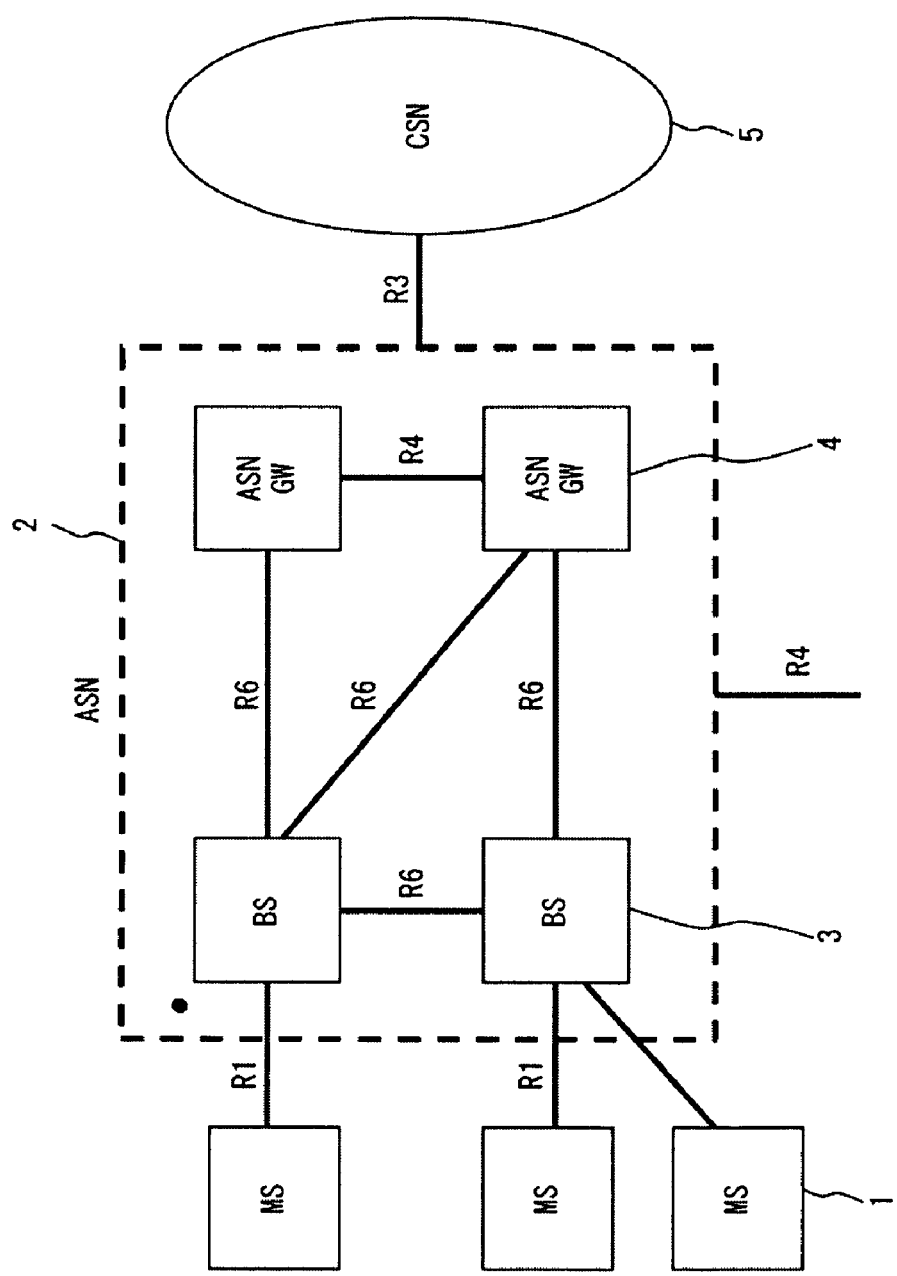
FIG. 1 is a diagram illustrating the outline of WiMAX system.
Figure 2:
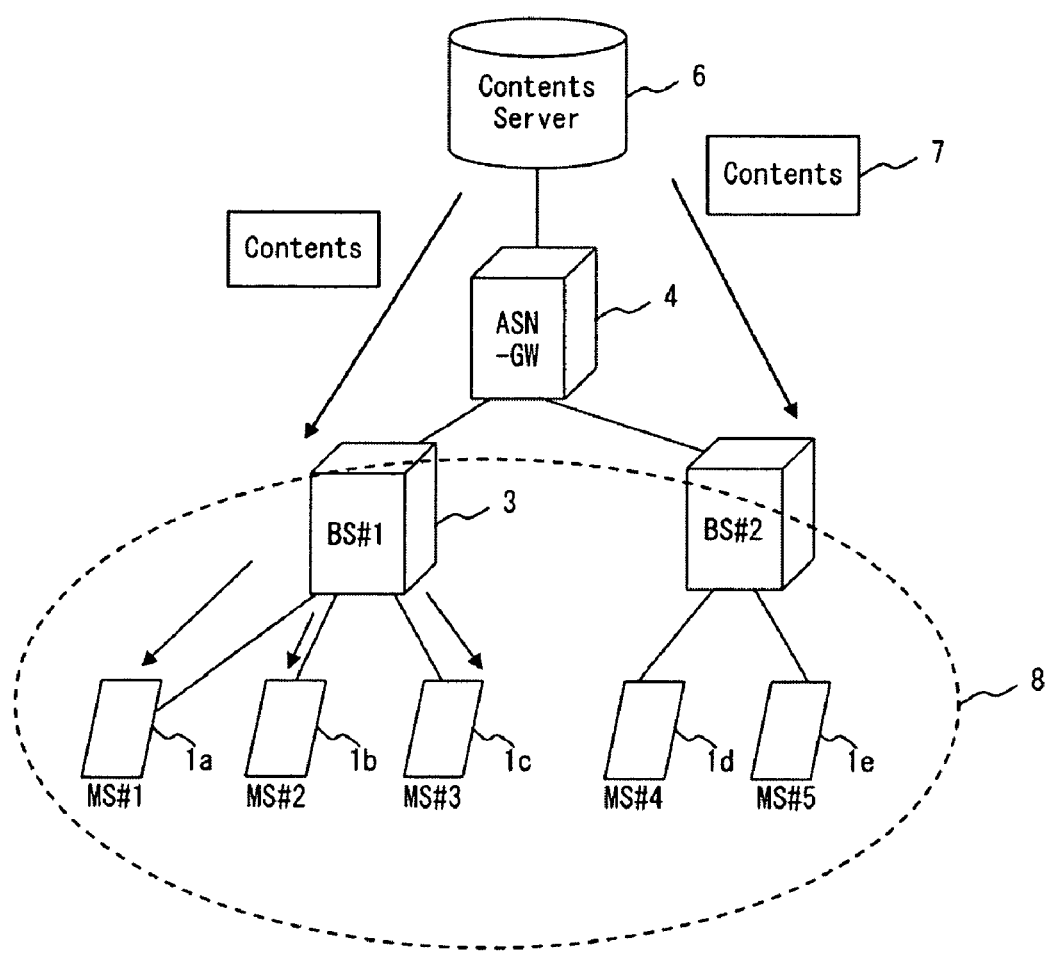
FIG. 2 is a diagram illustrating MCBCS.

Hereinafter, embodiments of the present invention are described in detail, referring to the drawings.

Outline

Figure 3:
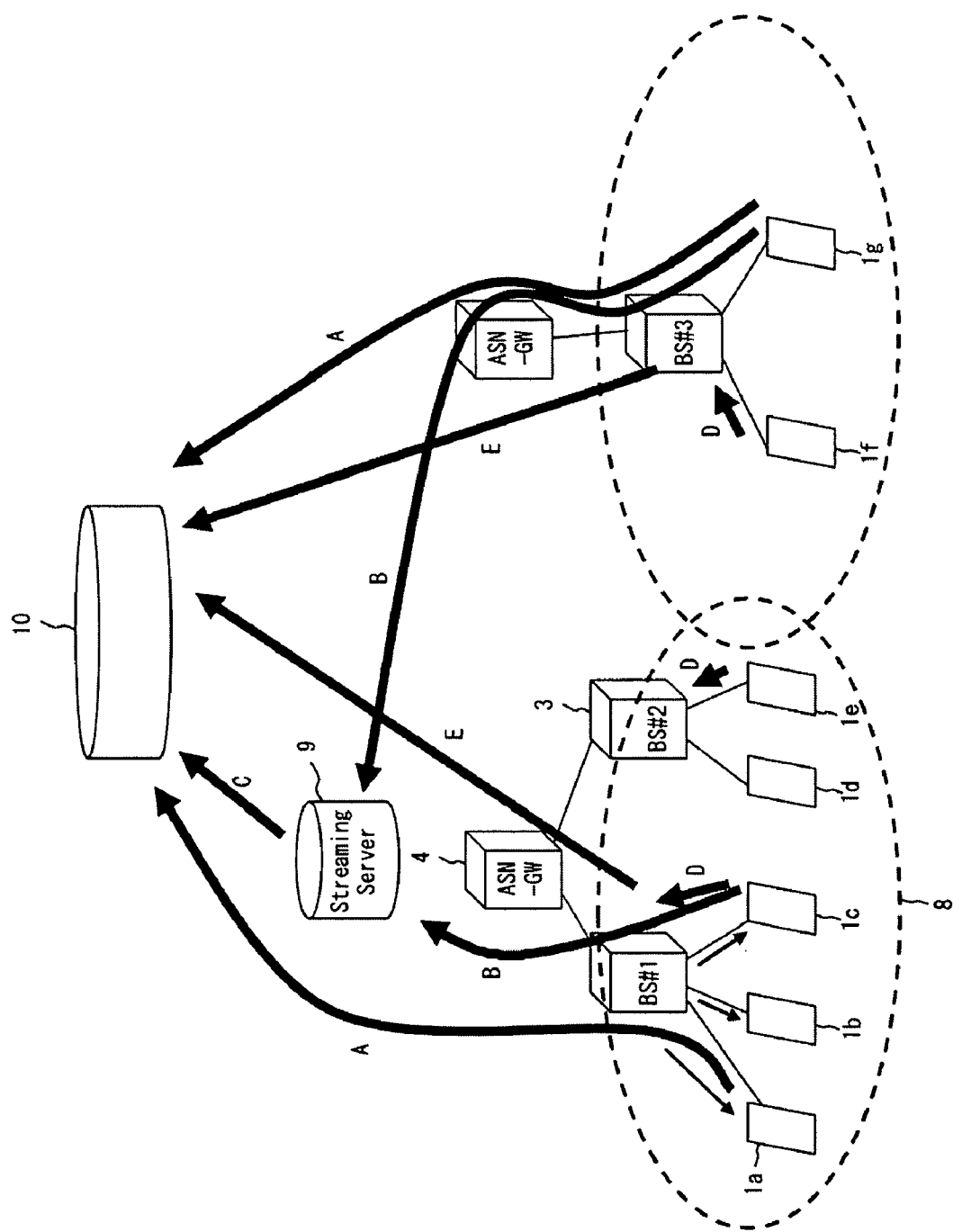
FIG. 3 is a diagram illustrating an example of the system configuration according to the embodiment.

FIG. 3 is a diagram illustrating an example of the system configuration according to the present embodiment. In this embodiment, a system including a base station 3, an ASN gateway 4, a streaming server 9 and a parameter adjustment node 10 is used to perform multicast distribution to a mobile station 1.

The streaming server 9 is a server that stores contents 7 to be distributed to the mobile station 1. A contents server 6 may be used in place of the streaming server 9. The ASN gateway 4 is an apparatus that acts as an interface between the streaming server 9 and the like and the base station 3, and transmits information distributed from the streaming server 9 to a subordinate base station 3.

The mobile station 1 receives the contents distributed from the streaming server 9 via the ASN gateway 4 and the base station 3, and calculates the reception state of the contents (data reception state). After calculating the data reception state, the mobile station 1 reports the data reception state to the parameter adjustment node 10. The report (feedback) of the data reception state by the mobile station 1 may be performed directly to the parameter adjustment node 10 as illustrated by the line A in FIG. 3, or may be performed via the base station 3 and the ASN gateway 4 as illustrated by the lines B and C, or D and E.

Figure 4:
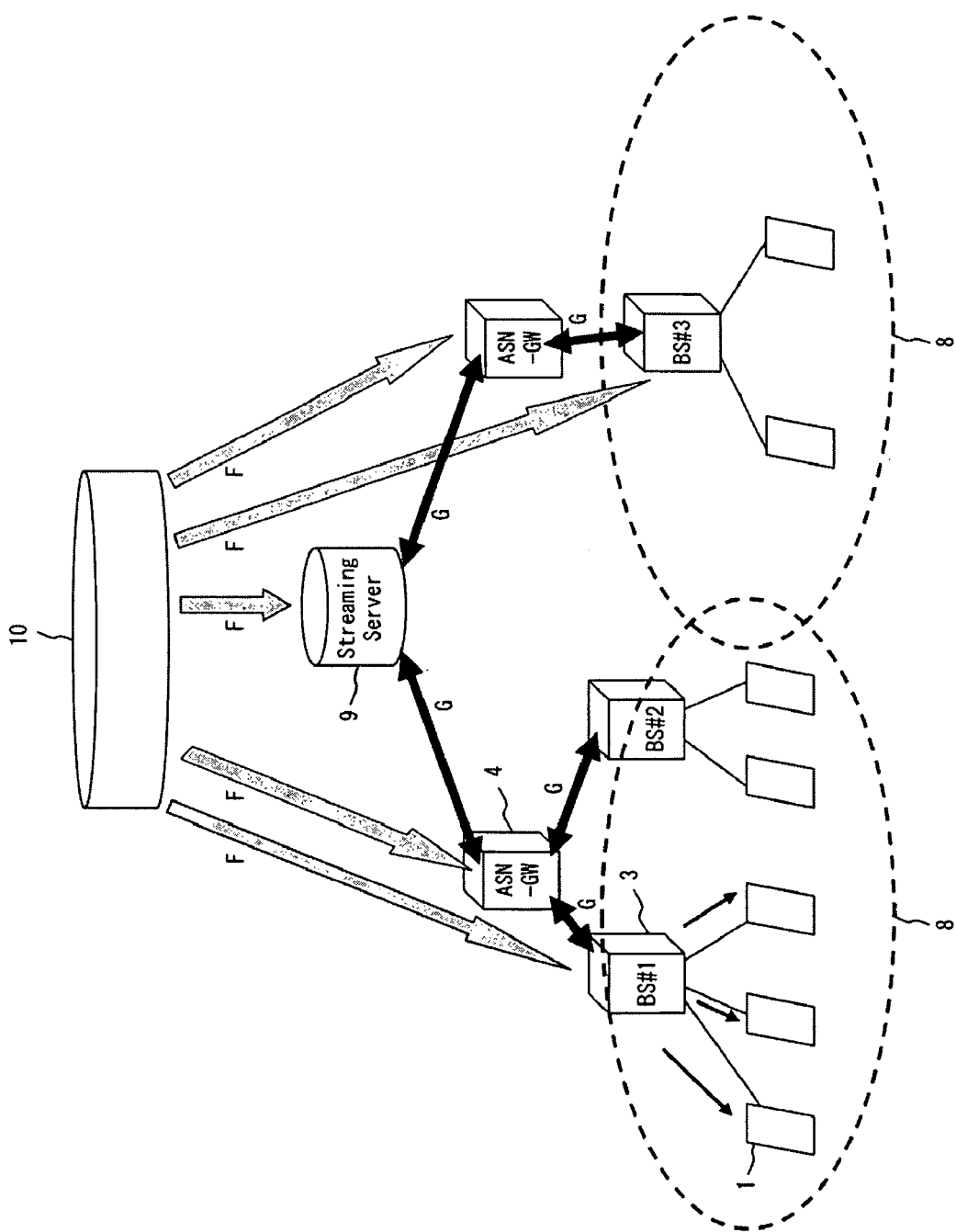
FIG. 4 is a diagram illustrating the parameter calculated by the parameter adjustment node being set in each node.

The parameter adjustment node (PAN) 10 analyzes the received data reception state of the mobile station 1 to determine whether the data distribution state to the mobile station 1 needs to be changed. When the data distribution state needs to be changed, the parameter adjustment node 10 calculates parameters to be set for the streaming server 9, the ASN gateway 4, and the base station 3, and transmits the parameters to each node. FIG. 4 is a diagram illustrating the parameter calculated by the parameter adjustment node 10 being set in each node.

Having received the notification of the parameter to be set as illustrated by an arrow F in FIG. 4, the streaming server 9 performs setting change to the transmitted parameter. With the setting change performed by the streaming server 9 as a trigger, the setting for the ASN gateway 4 is changed to the parameter calculated by the parameter adjustment node 10. With the setting performed for the ASN gateway 4 as a trigger, setting change is performed for the base station 3 in the same manner. In other words, as illustrated by arrows G in FIG. 4, with the setting of the transmitted parameter in a node such as the streaming server 9 as a trigger, setting change is performed for its subordinate nodes. In this regard, the parameter for setting change of the ASN gateway 4 and the base station 3 may be configured to be transmitted to the respective nodes by the parameter adjustment node 10 as illustrated by the arrow F, or may be configured to be transmitted via the streaming server 9 and the like.

When the setting to the parameter calculated by the parameter adjustment node 10 cannot be performed for any of the streaming server 9, the ASN gateway 4, and the base station 3, the setting change failure is transmitted to the parameter adjustment node 10. Having received the notification of the setting change failure from one of the nodes, the parameter adjustment node 10 stops the setting change and recalculate the parameter. Having recalculated the parameter, the parameter adjustment node 10 transmits the parameter again, and each node performs setting change as described above.

Since the parameter adjustment node 10 calculates the setting parameter for all nodes collectively, and each node performs parameter setting in accordance with the notification from the parameter adjustment node 10, the setting for the respective nodes can be managed in an integrated way. Therefore, the optimization of the data transmission condition from the streaming server 9 to the mobile station 1 can be done more speedy and efficiently, compared to the case in which the parameter for each node is changed individually to change the distribution rate to the mobile station 1.

In addition, the system configuration described above has an effect that the contents for emergency can be distributed smoothly. For example, the configuration is compared to a case in which emergency contents are distributed in the system disclosed in Patent Document 2, referring to FIG. 5. Assumed here for example is a case in which a base station 3 is equipped with 10-Mbps Ethernet as a wired interface and contents are distributed in the 10-Mbps bandwidth. Contents requiring the 10-Mbps bandwidth are distributed to the base station 3, and contents are distributed in the same bandwidth to each of the subordinate mobile stations. Under this condition, it is assumed that emergency contents requiring 5 Mbps are to be distributed.

In the system disclosed in Patent Document 2, the base station 3 performs adjustment and setting of the bandwidth. Therefore, the base station 3 that recognizes a need for the change of the distribution bandwidth of the contents is supposed to change the distribution bandwidth to the mobile station 1 to 5 Mbps and transmit it to a subordinate mobile station 1. Since a 5 Mbps-bandwidth is required between the base station 3 and the mobile station 1, 5 Mbps in the 10 Mbps bandwidth used for the distribution is to be secured for the emergency-contents distribution. However, the base station 3 cannot change the bandwidth that has been already used between the contents server and the base station 3, which is to remain at 10 Mps. In other words, since the bandwidth between the server to the base station 3 cannot be changed in accordance with the change of the bandwidth used for the transmission from the base station 3 to the mobile station 1, the band cannot be utilized efficiently.

On the other hand, in the system according to this embodiment, the parameter adjustment node 10 recognizes a change in the reception state in the mobile station 1 when the contents distribution at 10 Mbps currently performed is temporarily stopped and the emergency-contents distribution at 5 Mbps starts. Then, the parameter adjustment node 10 changes the parameter to be set for the streaming server 9, the ASN gateway 4 and the base station 3 so that the multicast distribution to the mobile station 1 can be performed efficiently. Thus, the setting is changed in real time without generating excess in bandwidth, making it possible to perform the efficient multicast distribution also in distributing emergency contents and so on.

Nodes Constituting the System According to the Embodiment

Hereinafter, each node constituting the system according to the embodiment is described.

[Mobile Station]

Figure 6:
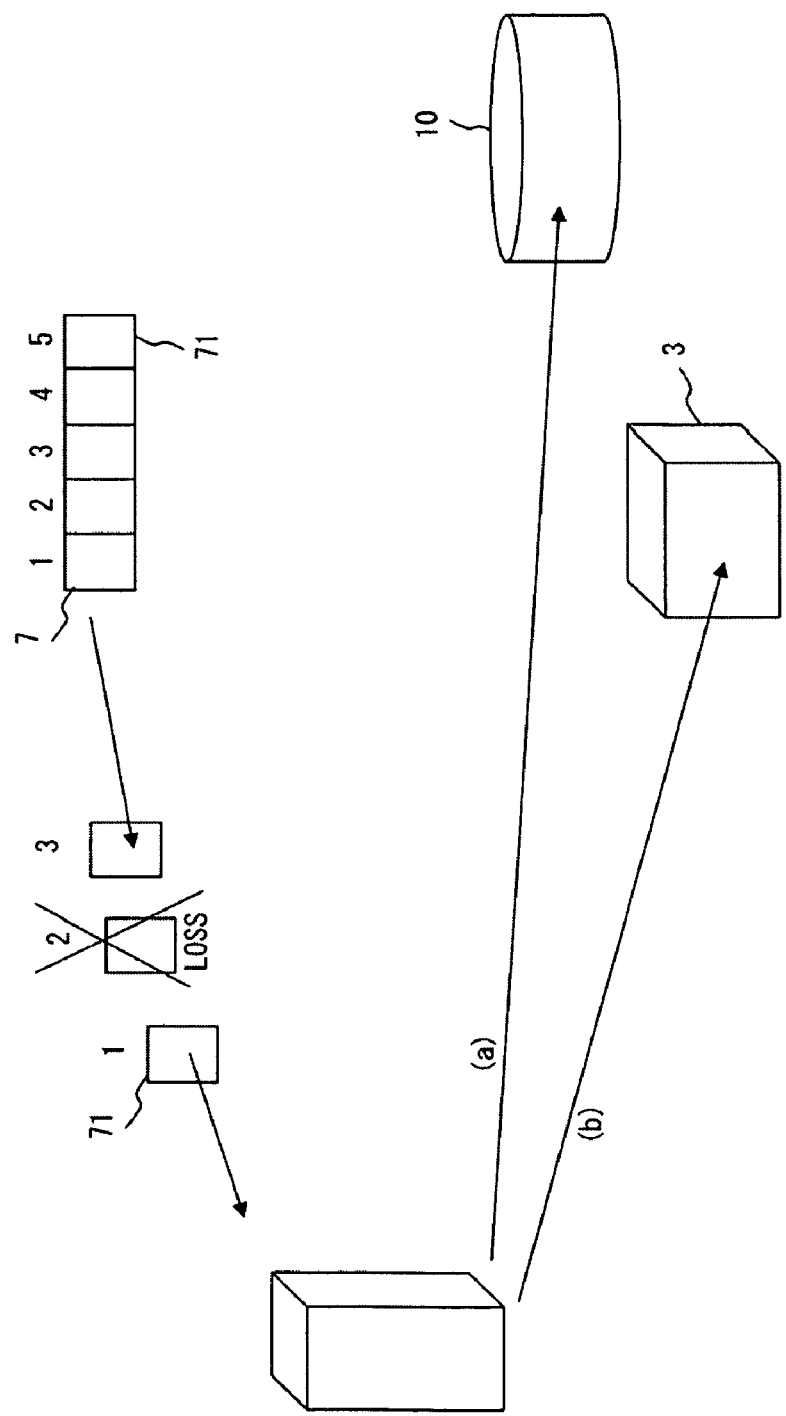
FIG. 6 is a diagram illustrating functions of a mobile station 1 used in the system according to the embodiment.

FIG. 6 is a diagram illustrating functions of a mobile station 1 used in the system according to the embodiment. The mobile station 1 includes a data reception state calculation unit and a reception state notification unit, in addition to given equipment for receiving data distributed by multicast distribution, and equipment for performing unicast communication.

The data reception state calculation unit calculates the rate at which the mobile station 1 succeeded in receiving data distributed by multicast distribution. For example it calculates the frame rate actually received in a predetermined time period according to the following equation.

(received frame rate)=(the actual number of received frames)/(the total number of frames that are expected to be received)

As represented in FIG. 6, when contents 7 having five frames 71 are distributed to the mobile station 1 and the mobile station 1 succeeds in receiving four of the frames 71, the reception rate is ⅘. The parameter adjustment node 10 receives the reception rate calculated by the mobile station 1 and calculates the parameter to be set for the subordinate nodes.

The reception state notification unit transmits the reception state to the parameter adjustment node 10 and the like. The reception stat notification unit is capable of performing two types of feedback, i.e., the feedback of the data reception state at the application level, and the feed back at the IEEE802.16e level.

The feedback of the data reception state at the application level is depicted by (a) in FIG. 6. In the feedback at the application level, the reception state notification unit transmits the data reception state to the parameter adjustment node 10. In addition, as described later, the data reception state may be configured to be transmitted to the streaming server 9 via the base station 3 and the ASN gateway 4. In other words, while the notification may be made via the base station 3 and the ASN gateway 4, the destination of the notification by the reception state notification unit is the parameter adjustment node 10 or the streaming server 9. The data reception state transmitted at this time includes the reception frame rate of the mobile station 1, contents ID and so on. The feedback at the IEEE 802.16e level is depicted by (b) in FIG. 6. When performing the feedback at the IEEE802.16e level, the reception state notification unit transmits the MAC frame rate, HARQ (Hybrid Automatic Repeat Request) block rate, contents ID and so on, to the base station 3 as the data reception state. Each of the two types of feedback of data reception state is described in detail later.

FIG. 7 is a flowchart of the feedback at the application level performed by the mobile station 1. The mobile station 1 receives contents from the streaming server 9 by multicast communication, and calculates the rate of frames received successfully in a predetermined time period (steps S1, S2). The calculated frame rate is transmitted to the streaming server 9 or the parameter adjustment node 10 by transmitting an MS_Rpt_apl message (step S3). The configuration of the MS_Rpt_apl message is described in detail later. The mobile station 1 performs unicast communication when transmitting the MS_Rpt_apl message to the parameter adjustment unit 10 and the like.

[Parameter Adjustment Node]

Figure 8:
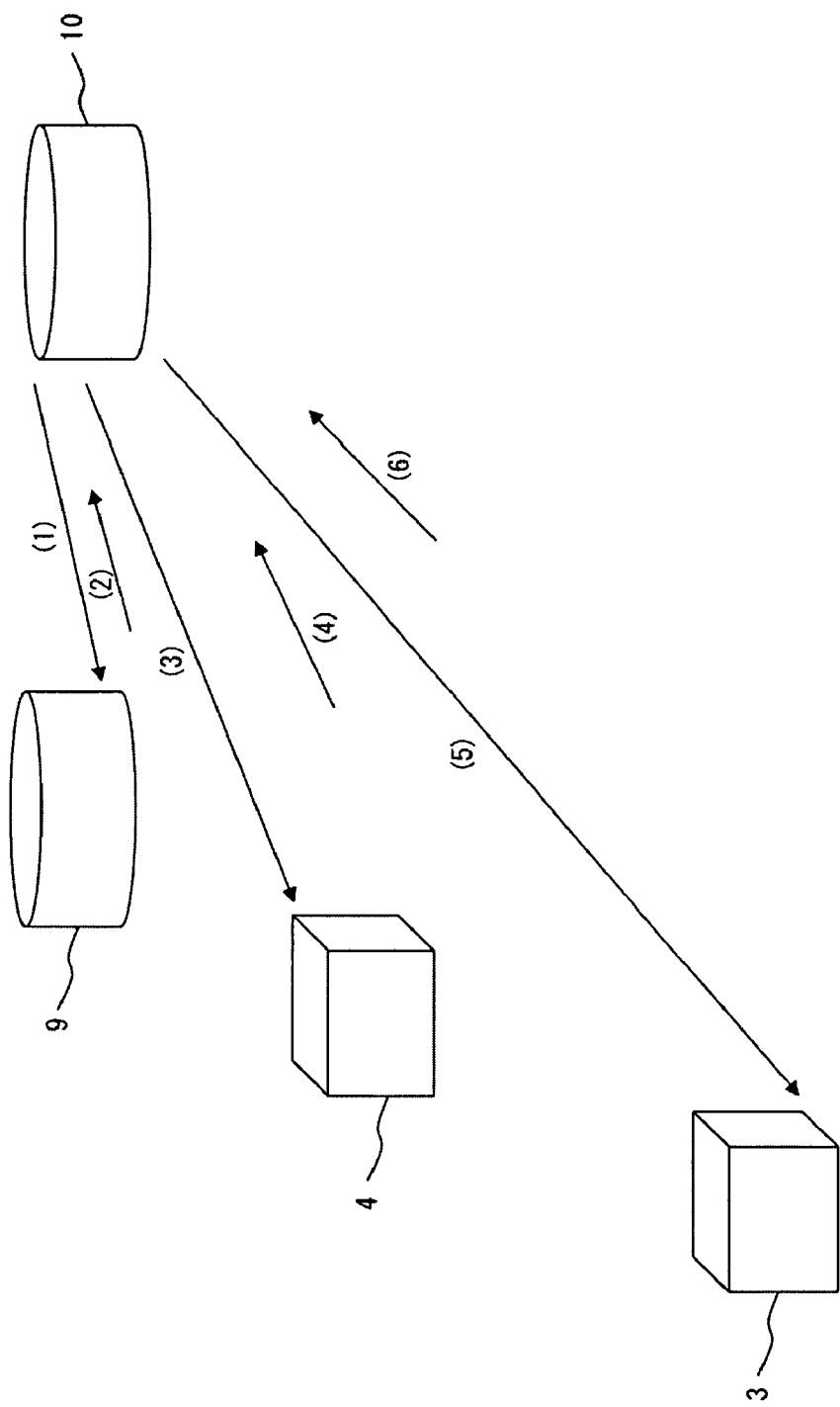
FIG. 8 is a diagram illustrating functions of the parameter adjustment node 10 according to the embodiment.

FIG. 8 is a diagram illustrating functions of the parameter adjustment node 10 according to the embodiment. As described above, the parameter adjustment node 10 collects and analyzes the data reception state of the mobile station 1, and calculates a suitable parameter for multicast distribution, for the base station 3 and the like involved in the multicast distribution to the mobile station 1. The parameter to be calculated here includes, for example, the bandwidth and so on.

The parameter adjustment node 10 includes a reception state analysis unit, a parameter calculation unit, a parameter setting control unit and a memory.

The parameter adjustment node 10 stores, in the memory, the IDs and arrangement of the streaming server 9, ASN gateway 4 and the base station 3, as preset information (configuration information). The parameter adjustment node 10 also stores the arrangement state of base stations 3 located in the MCBCS zone 8 and the ID provided for the respective contents (contents ID). The memory also includes a data reception state storage table, in which the data reception state received from the mobile station 1 is stored.

Furthermore, the parameter adjustment node 10 originally has the distribution target value for the mobile station 1 and a setting change table. The setting change table is a table that pairs the combinations of setting change parameters for each node with the expected value of the amount of change in the data reception state of the mobile station 1 when the combinations are used.

The reception state analysis unit obtains the data reception state of the mobile station 1 and calculates the reception rate of the data distributed by multicast distribution. The reception rate in this regard represents the rate of the actual number of frames that the mobile station 1 received successfully, in the total number of frames transmitted from the streaming server 9 to the mobile station 1 in the MCBCS zone 8 in a predetermined time period.

The parameter calculation unit calculates the difference between the distribution target value for the mobile station 1 and the data reception state of the mobile station 1, and selects a combination of parameters for the respective nodes from the setting change table so that the difference becomes close to the difference value in the setting change table. The parameter adjustment node 10 transmits the selected parameters to the respective nodes such as the base station 3, as depicted by arrows (1), (3) and (5) in FIG. 8. The calculation method and notification method of the parameter are described in detail later.

When each node receives the notification of the parameter from the parameter adjustment node 10, each node checks if the node itself can be set to the transmitted parameter, and transmits, to the parameter adjustment node 10, a message indicating whether or not the setting can be performed (arrows (2), (4) and (6) in FIG. 8). The parameter setting control unit checks, using the message received from each node, whether the setting-change parameter has been set for the base station 3 and the like to which the parameter has been transmitted. When there is any node that cannot be set to the transmitted parameter, the parameter adjustment node 10 performs resetting of the parameter.

[Base Station]

Figure 9:
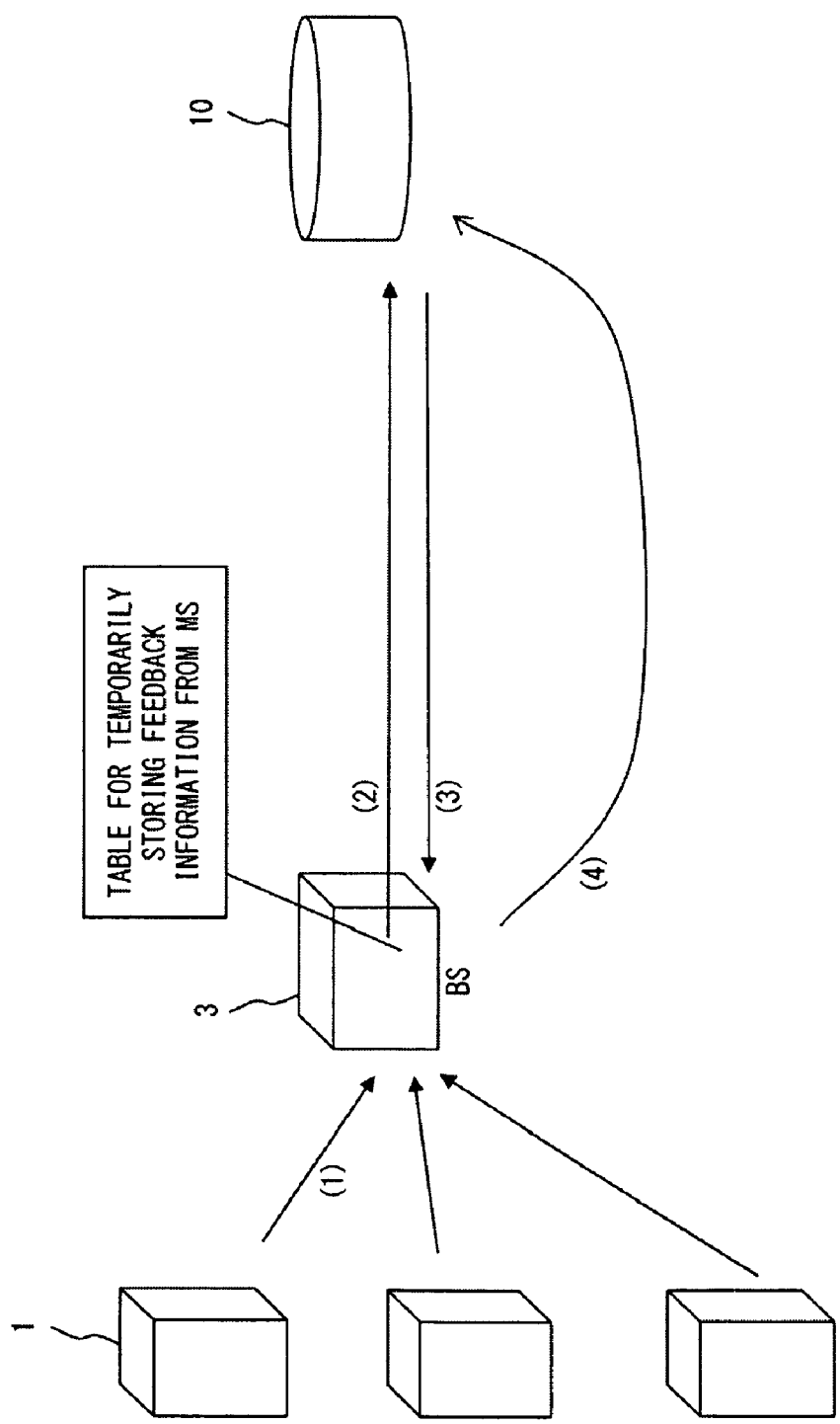
FIG. 9 is a diagram illustrating functions of the base station used in the system according to the embodiment.

FIG. 9 is a diagram illustrating functions of the base station 3 used in the system according to the embodiment. The base station 3 includes a parameter control unit and a setting information notification unit, in addition to given equipment for transmitting/receiving data to/from the mobile station 1, the ASN gateway 4 and so on.

The parameter control unit determines whether or not parameter setting can be performed, and controls the parameter setting and the like. As depicted by (5) in FIG. 8 or by (3) in FIG. 9, for example, parameters such as the bandwidth (1 Mbps, 50 kbps etc.), encoding rate (½, ⅔, ¾), and modulation method that can be changed in the base station 3 are transmitted from the parameter adjustment node 10 to the base station 3. For example, 64 QAM (quadrature amplitude modulation), or 16 QAM, QPSK (quadrature phase shift keying), etc. is transmitted as the modulation method. Upon receiving the notification, the parameter setting control unit determines whether or not to the setting to the parameter can be performed.

The situation in which a received message is broken and cannot be analyzed is one of the cases where setting to the transmitted parameter cannot be performed. In addition, the parameter control unit may be configured so that in a situation such as when the parameter adjustment node 10 transmits notification to a base station 3 to change its bandwidth to 10 kbps while the base station 3 requires 6 Mbps for contents distribution, the parameter control unit determines that the bandwidth change cannot be carried out. According to such a configuration, the priority of contents can be managed using contents ID and the like, to perform parameter setting change for efficient multicast distribution while continuing the distribution of contents having high priority.

Then, when setting to the transmitted setting-change parameter can be performed, the parameter control unit requests the setting information notification unit to transmit, to another node, setting availability notification which indicates that the node can be set to the transmitted parameter.

In response to the request from the parameter control unit, the setting information notification unit transmits the setting availability notification described above to another node. The node to be the destination of the notification of the setting change notification is the node that transmitted the setting-change parameter to the base station 3. For example, when the base station 3 received the notification of the parameter directly from the parameter adjustment node 10, the setting availability notification is transmitted to the parameter adjustment node 10. When the parameter was transmitted via the ASN gateway 4, the setting availability notification is transmitted to the ASN gateway 4. As an example, a case in which the setting information notification unit transmits the setting availability notification to the parameter adjustment node 10 is depicted by (4) in FIG. 9. In addition, the setting information notification unit may transmit, to another node, setting change notification indicating the completion of the parameter setting change, when the change to the parameter transmitted by the parameter adjustment node 10 is performed successfully.

On the other hand, when the setting to the parameter transmitted for the setting change failed, the setting information notification unit transmits setting failure notification to the node that transmitted the parameter to the base station 3. When the parameter adjustment node 10 obtains the setting failure notification, the parameter adjustment node 10 recalculates the parameter as described above.

In addition, the base station 3 receives the data reception state of the mobile station 1 when the mobile station 1 performs the feedback at the IEEE802.16e level (FIG. 9 (1)). In this case, the base station 3 stores the data reception state received from the mobile station 1 in the data reception state storage table provided in the memory area, and transmits the data stored in the table to the parameter adjustment node 10, at a predetermined time interval or in accordance with a request from another node (FIG. 9 (2)).

[ASN Gateway and Streaming Server]

The ASN gateway 4 has functions to be an interface between the streaming server 9 or contents server 6 and the like, and the base station 3. The ASN gateway 4 includes, in addition to given equipment for realizing the functions, a parameter control unit and a setting information notification unit.

The streaming server 9 has functions to distribute contents 7 to the mobile station 1, and includes, in addition to given equipment for realizing the functions, a parameter control unit and a setting information notification unit.

The operations performed by the parameter control unit and the setting information notification unit in both of the ASN gateway 4 and the streaming server 9 are similar to those performed by the same units in the base station 3.

The ASN gateway 4 and the streaming server 9 receive the notification of the parameter from the parameter adjustment node 10 as depicted by the arrows in FIG. 8 (1) and the like, and perform operations such as the notification of whether or not setting to the transmitted parameter can be performed. The parameter to be transmitted from the parameter adjustment node 10 to the ASN gateway 4 includes parameter related to the bandwidth, priority control and the like. Meanwhile, the parameter to be transmitted to the streaming server 9 includes the codec format (MPEG1, MPEG2, MPEG4, etc.), average bandwidth rate (1 Mbps, 500 kbps, etc.), and the like. The configuration may also be made so as to transmit the frame value (30 fps, 15 fps, 10 fps, etc.) and the picture size (640×480 pixels).

Embodiment (1)

Hereinafter, the operations of the system according to the present invention are described in detail. In order to make the description understood more easily, the system is illustrated here as the one including a single unit of the parameter adjustment node 10, the streaming server 9, the ASN gateway 4, and the base station 3, respectively. However, as mentioned above, the configuration may be made so that a plurality of the mobile stations 1, the base stations 3, and the ASN gateways 4 are included in a single system.

[Notification of the Data Reception State from the Mobile Station]

Figure 10:
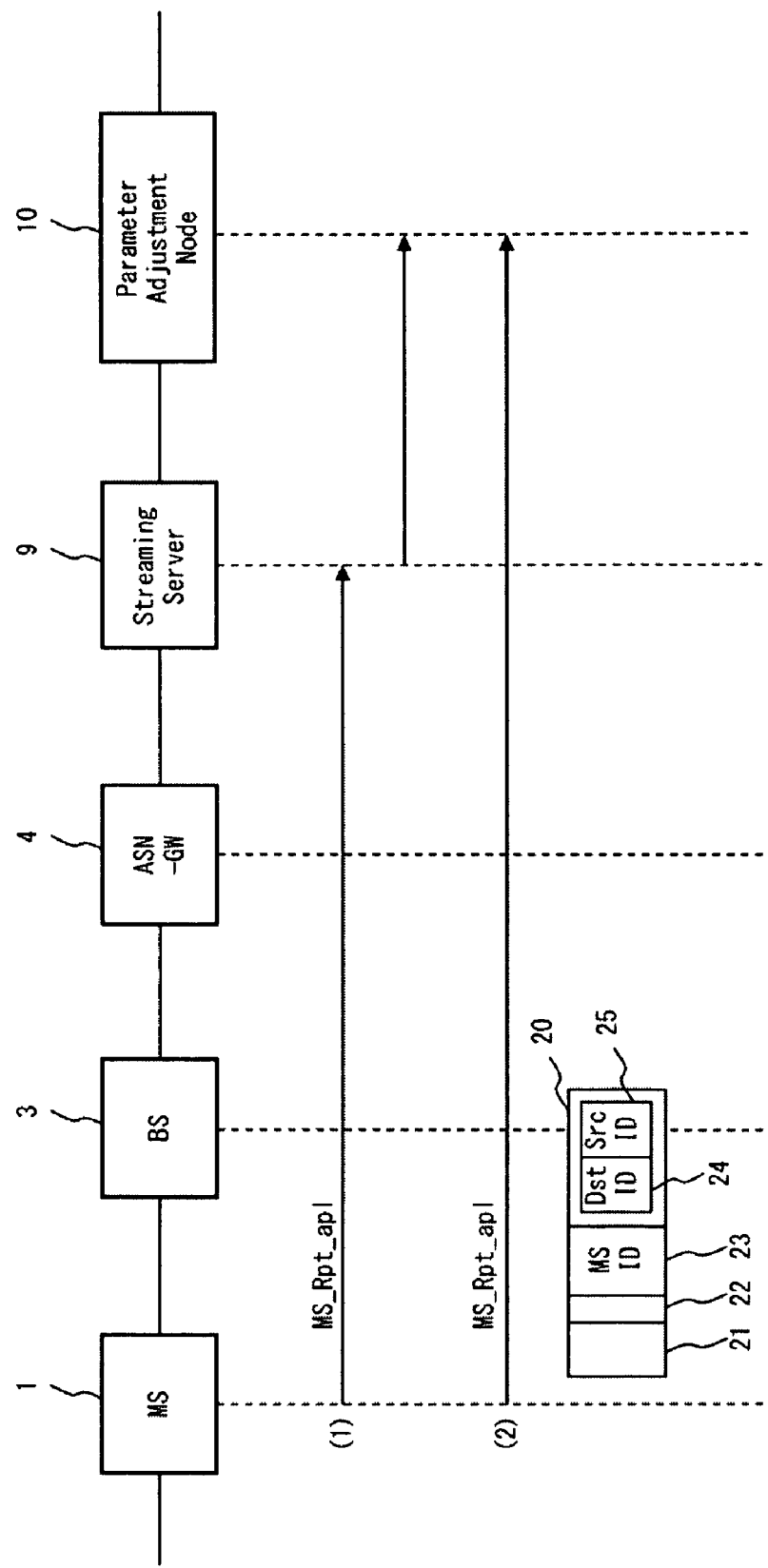
FIG. 10 is a sequence diagram illustrating the operations in performing notification of the data reception state to the parameter adjustment node by the feedback at the application level.

FIG. 10 is a sequence diagram illustrating the operations in performing notification of the data reception state to the parameter adjustment node 10 by the feedback at the application level. The feedback at the application level can be realized by the transmission of an MS_Rpt_apl message 20 from the mobile station 1 to the parameter adjustment node 10 as depicted by (2) in FIG. 10. The transmission of MS_Rpt_apl message 20 is controlled by the reception state notification unit, and the message is also referred to as reception information notification. As represented in FIG. 10, the MS_Rpt_apl message 20 includes a contents ID 21, an MCBCS zone ID 22, a mobile station ID 23, a destination ID 24 and a source ID 25, as well as information such as the frame rate of the mobile station 1. The transmission of the MS_Rpt_apl message 20 may be configured to be carried out regularly at given time intervals.

The parameter adjustment node 10 recognizes the MCBCS zone 8 in which the mobile station 1 that transmitted the MS_Rpt_apl message 20 is located, by the MCBCS zone ID 22 contained in the message. In addition, as described above, the arrangement of the MCBCS zone 8, the ASN gateway 4 and the base station 3, is stored in the parameter adjustment node 10, as the configuration information. Therefore, the base station 3 and the ASN gateway 4 constituting the MCBCS zone 8 in which the mobile station 1 is located can be recognized by referring to the database in the memory of the parameter adjustment node 10, to identify the node for which the parameter change is to be performed.

Figure 11:
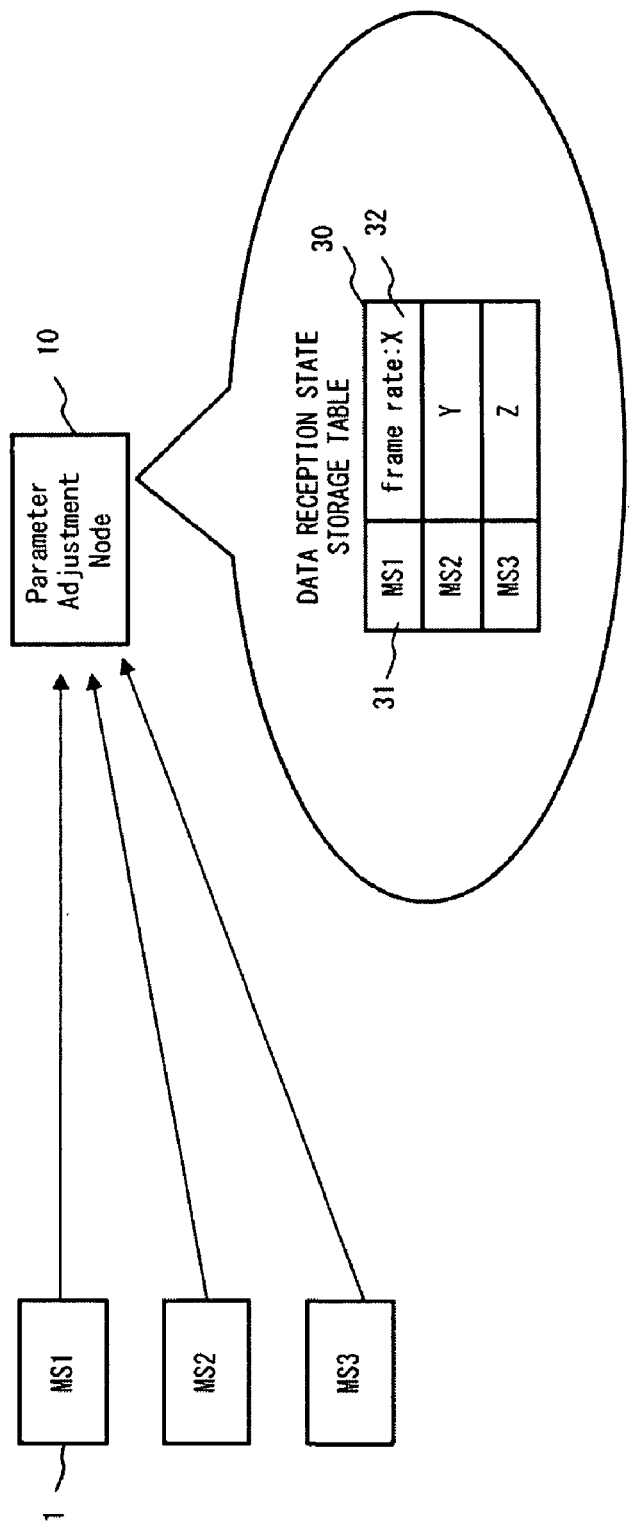
FIG. 11 is a diagram illustrating the operations in performing data reception state notification from the mobile station to the parameter adjustment node.

FIG. 11 is a diagram illustrating the operations in performing data reception state notification from the mobile station 1 to the parameter adjustment node 10. Upon receiving the MS_Rpt_apl message 20 from the mobile station 1, the parameter adjustment unit 10 stores the information in a data reception state storage table 30. While the mobile station ID 31 and frame rate 32 are stored in the data reception state storage table 30 depicted in FIG. 11, the configuration may also be made so as to store other information together.

Figure 12:
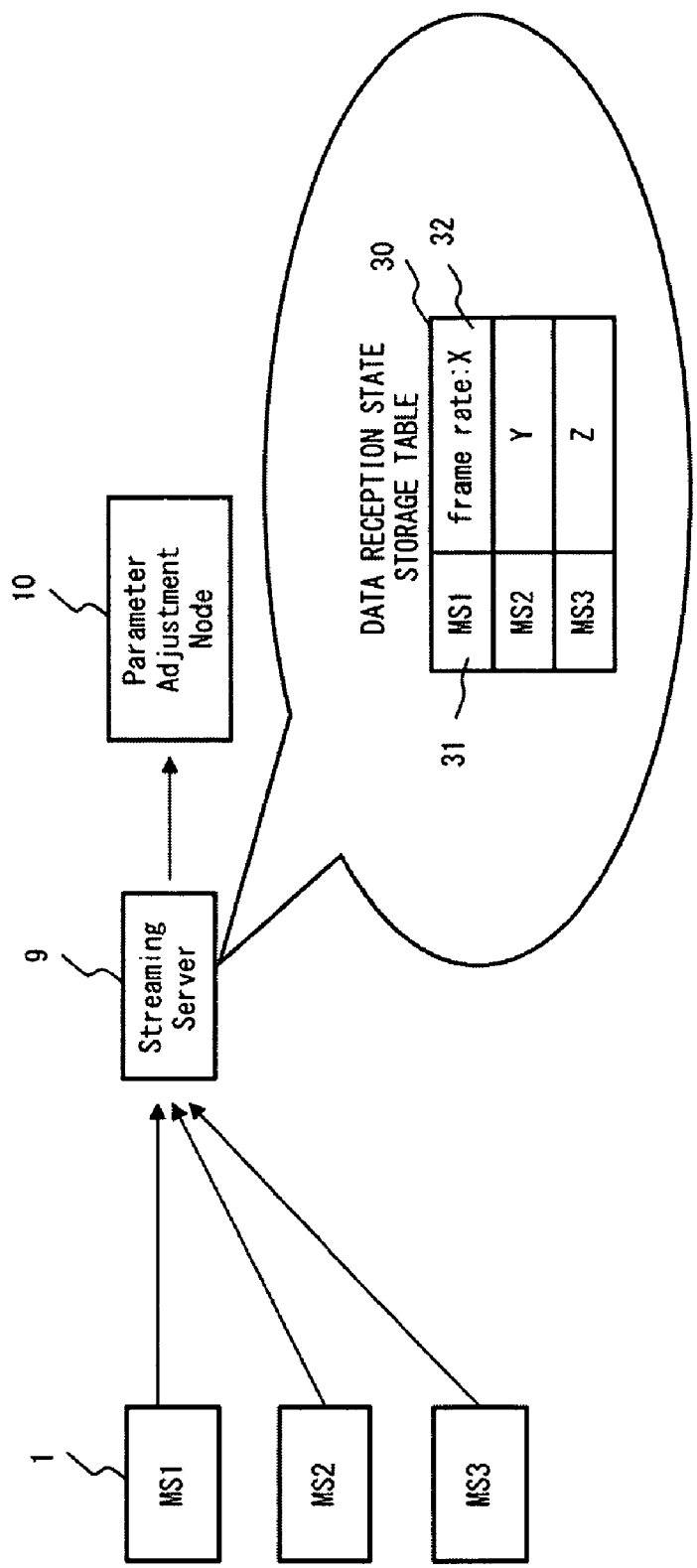
FIG. 12 is a diagram illustrating the operations in performing data reception state notification from the mobile station to the streaming server.

Meanwhile, when using the feedback at the application level, the configuration may also be made so that the MS_Rpt_apl message 20 is transmitted from the mobile station 1 to the streaming server 9 as depicted by (1) in FIG. 10. In this case, the information in the MS_Rpt_apl message 20 (including the mobile station ID 31 and the frame rate 32) is stored in the data reception state storage table 30 provided in the streaming server 9, as depicted in FIG. 12. When the data from the mobile station 1 are accumulated, the streaming server 9 transmits the data stored in the data reception state storage table 30 to the parameter adjustment node 10, at a predetermined time intervals, for example, every 30 minutes.

[Calculation of Setting-Change Parameter in the Parameter Adjustment Node]

The parameter adjustment node 10 calculates the reception rate of mobile stations 1 that are receiving the multicast distribution based on the reception state of each mobile station 1, and calculates a setting-change parameter for each node so as to make the reception rate within a predetermined range of values. In this regard, the range of values to be the target of the adjustment of the reception rate is referred to as an acceptable reception rate range.

Figure 14:
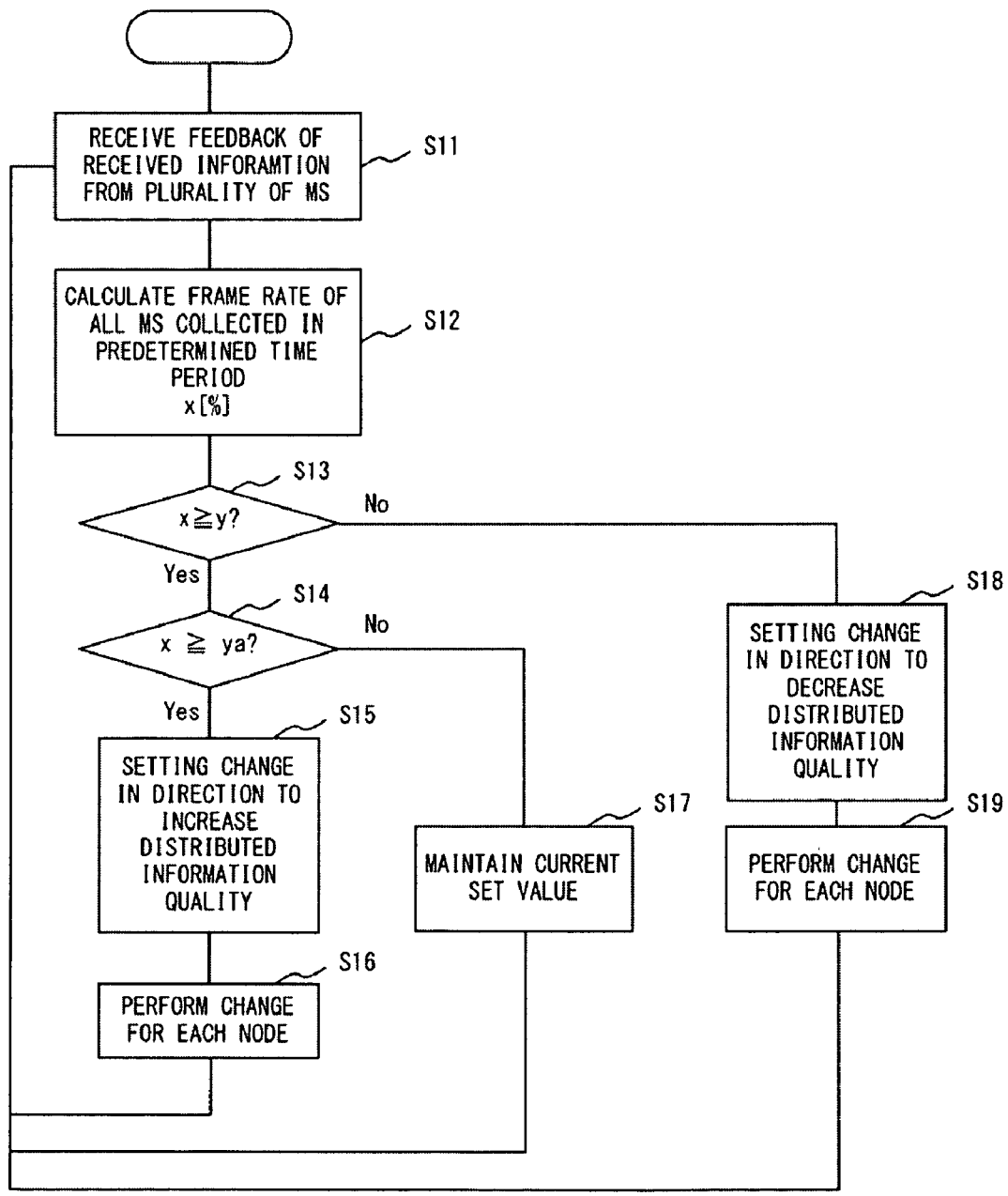
FIG. 14 is a flowchart describing the parameter setting change for each node performed by the parameter adjustment node.

FIG. 13 is a diagram illustrating the relationship between the reception rate and the acceptable reception rate range. The value y represents the distribution target value of the contents. The value ya is the adjustment threshold value that represents the maximum value of the reception rate that is acceptable as the reception rate. The difference $\Delta y$ indicating the difference between the distribution target value y and the adjustment threshold value ya represents the acceptable reception rate range. FIG. 14 is a flowchart describing the parameter setting change for each node performed by the parameter adjustment node 10. Hereinafter, the operations of the parameter adjustment node 10 in calculating the setting-change parameter are described, referring to FIGS. 13 and 14. The values x1-x3 are examples of the value of the reception rate.

When the parameter adjustment node 10 recognizes the reception state of a mobile station 1, the reception state analysis unit of the parameter adjustment node 10 calculates the reception rate (steps S11-S12). As mentioned above, the reception rate is a rate of the actual number of frames that the mobile station 1 received, in the total number of frames transmitted from the streaming server 9 to the mobile station 1. Assuming that data are distributed to mobile stations $1a$-$1g$ as represented in FIG. 3, the reception rate of the mobile stations $1a$-$1e$ being 0.84, and the reception rate of the mobile stations $1f$ and $1g$ being 0.7, the reception rate can be calculated as follows.

$$(0.84*5+0.7*2)/7=0.8$$

The actual reception rate calculated using the reception state of the mobile stations 1 may be referred to as the actual value.

When the reception rate is calculated in the reception state analysis unit, the parameter calculation unit calculates the setting-change parameter for each node, so that the reception rate after the parameter-setting change comes within the range of values of the acceptable reception rate (steps S13-S19). The operations of the parameter adjustment node 10 have the following three patterns, in accordance with the result of comparison of the reception rate with the distribution target value y and the adjustment threshold value ya (steps S13, S14).

When the reception rate is lower than the distribution target value (steps S18, S19)

When the value of the reception rate is x3 represented in FIG. 13, the reception rate is lower than the distribution target value y. In this case, the frame reception rate in each mobile station 1 seems to be lowered since the quality of information distributed to the mobile station 1 (received information quality in the mobile station) is excessive with respect to the resource that can be used for the multicast distribution. Therefore, the parameter calculation unit changes the parameter so as to reduce the received information quality in the mobile station 1, by means of, for example, decreasing the picture quality, thereby improving the reception rate (steps S18, S19).

(2) When the Reception Rate is Within the Acceptable Reception Rate Range (step S17)

When the value of the reception rate is x2, there is no need for changing the parameter for each node, since x2 is within the acceptable reception rate range (step S17).

(3) When the Reception Rate is Higher than the Adjustment Threshold Value (steps S15, S16)

When the value of the reception rate is higher than the adjustment threshold value ya as represented by x1, the received information quality in each mobile station 1 seems to be low with respect to the resource that can be used for the distribution of the contents. In such a case, the parameter calculation unit changes the parameter so as to improve the received information quality in the mobile station 1 by means of, for example, increasing the picture quality, thereby decreasing the reception rate (steps S15, S16).

Thus, the reception rate can be adjusted to come within the range of values of the acceptable reception rate by the processes in three patterns described above. Next, the calculation method of the setting-change parameter is described, using an example of the setting change table stored in the parameter adjustment node 10. The notification of the parameter to each node performed in steps S16 and S19 are described in detail later.

FIG. 15 is a diagram describing an example of the setting change table stored in the parameter adjustment node 10. In the setting change table illustrated in FIG. 15, combinations of parameters are stored in a way in which the combination described in higher rows of the table results in higher received information quality. When the received information quality is increased by one level in the stored combinations, it is estimated that the reception rate expected with the combination decreases by 0.05 (5%). Parameters to be changed include, for example, the codec value, picture size, average rate, bandwidth to be used, priority, modulation method, encoding rate, etc, while other parameters may also be added as the object of the change. FIG. 15 merely illustrates an example of the setting change table, and the amount of change of the reception rate expected between combinations, or parameters to be changed, are arbitrary.

When the parameter calculation unit determines that the parameter change is required in step S16 or step S19, the parameter calculation unit calculates the difference between the actual value x of the reception rate and the distribution target value y. Next, the parameter calculation unit refers to the setting change table using the calculated difference value, and selects the combination of parameters with which the difference can become zero, as the setting change parameters for each node. For example, it is assumed that the currently-set values for each node are as follows, as illustrated in (A) in the setting change table.

Codec value: MPEG1
Size: 640×480
Average rate: 1 M
Bandwidth: 600 k
Priority: AF11
Modulation method: QPSK
Encoding rate: ⅔

When the actual value of the reception rate is higher than y by 0.2 (20%) at x1 in FIG. 13, the parameter calculation unit selects parameters so that the amount of change is 0.2. Since it is expected that the reception rate changes by 0.05 when the combination of the parameters is changed by one level, the combination (B) of the parameters represented below that improves the received information quality in the mobile station 1 by four levels is selected.

Codec value: MPEG2
Size: 1024×768
Average rate: 5 M
Bandwidth: 6 M
Priority: AF41
Modulation method: 16 QAM
Encoding rate: ¾

When there is no combination of the parameters that can eliminate the difference between the actual value x of the reception rate and the distribution target value y, a combination of the parameters with which the reception rate becomes as close as possible to the distribution target value y is selected. For example, assuming that the actual value of the reception rate is lower than y by 0.08 (8%) at x3 in FIG. 13, the parameter calculation unit attempts to change the actual value of the distribution to the distribution target value y by decreasing the quality of information distributed to the mobile station 1. However, since the setting change table does not contain any combination that is expected to be able to eliminate the 0.08 difference, it changes the combination by two levels and selects the parameters (C). By setting the parameters for each node as follows, Codec value: MPEG4
Size: 160×120
Average rate: 200 k
Bandwidth: 300 k
Priority: AF11
Modulation method: QPSK
Encoding rate: ½ it is expected that the reception rate improves by 0.1 (10%).

While a plurality of items including the codec value, size, average rate etc. were changed in the above example, the change may be made to only a single item. For example, when the current setting of the values is close to the maximum quality in the setting change table, only the change of the encoding rate from ¾ to ⅔ is required to decrease the quality by one level to improve the reception rate by 0.05. Generally, when the quality of distributed information is set higher, the number of items that require setting change to change the quality of distributed information by one level tends to be fewer.

[Notification and Setting of the Setting-Change Parameter for Each Node]

Upon selecting the combination of setting-change parameters, the parameter adjustment node 10 temporarily stores it in the memory, and performs the notification of the selected parameter to each node. For example, when the codec value is to be changed, the setting-change parameter is transmitted to the streaming server 9. Thus, the setting change is performed in various nodes, depending on the selected parameter.

Figure 16:
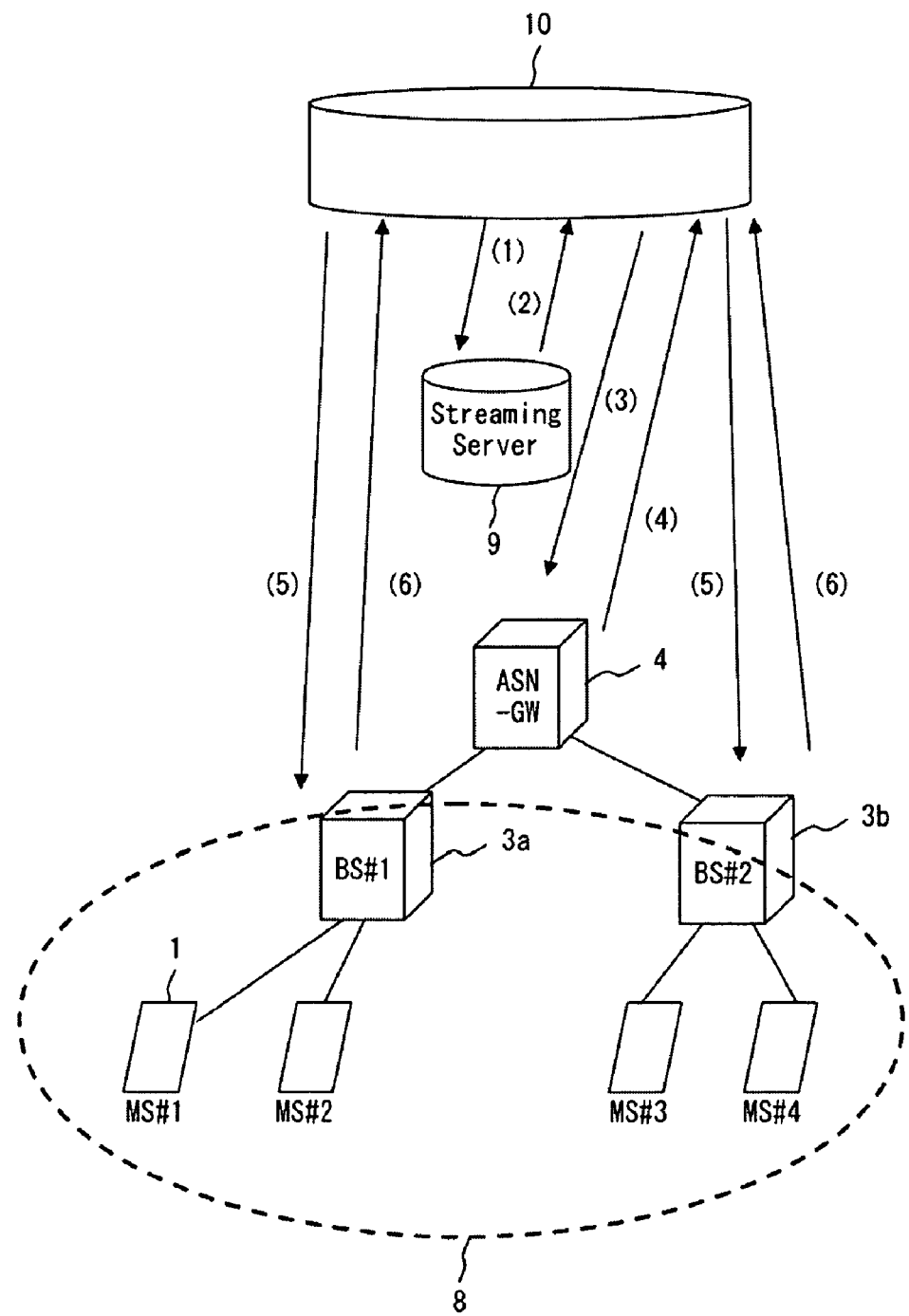
FIG. 16 is a diagram illustrating the process in which the setting-change parameter is transmitted from the parameter adjustment node and the setting change is performed in each node in embodiment (1).
Figure 17:
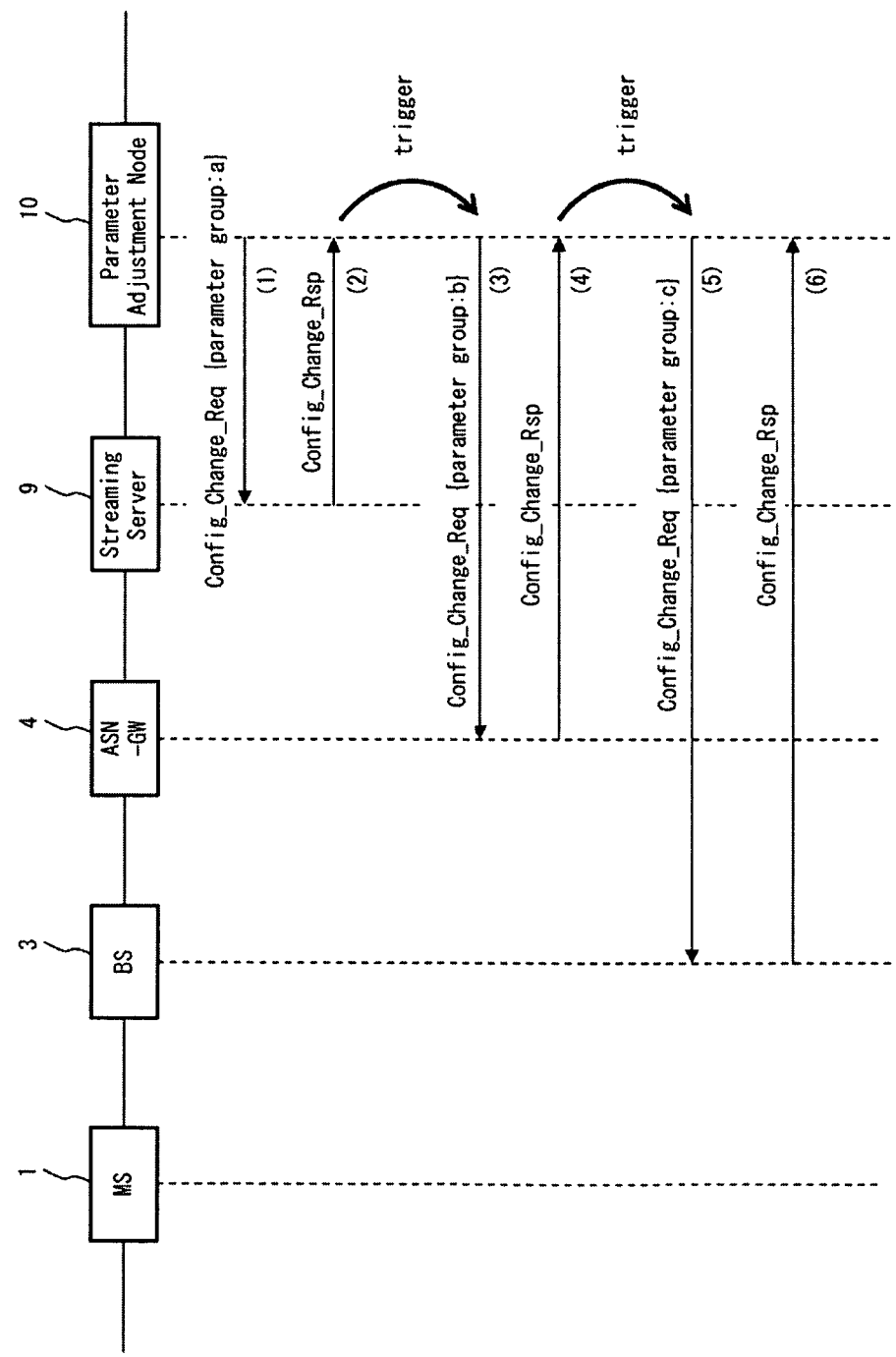
FIG. 17 is a sequence diagram of the process in which the setting-change parameter is transmitted from the parameter adjustment node and the setting change is performed in each node in embodiment (1).

FIG. 16 is a diagram illustrating the process in which the setting-change parameter is transmitted from the parameter adjustment node 10 and the setting change is performed in each node. FIG. 17 is a sequence diagram of the process. Hereinafter, the procedures for performing the notification and setting of setting-change parameters are described, referring to FIGS. 16 and 17.

The parameter adjustment node 10 transmits a Config_Change_Req message to the streaming server 9 to notify that a parameter change is required. The Config_Change_Req message includes a source ID, destination ID, a parameter to be used in the destination node, and may also be configured to include other information. Upon generating the Config_Change_Req message, the parameter adjustment node 10 selects, from the setting-change parameters, parameters to be transmitted to the streaming server 9, including the codec value, picture size, etc. The group of parameters requiring setting change in the streaming server 9 are referred to as a parameter group a.

Upon receiving the Config_Change_Req message, the streaming server 9 checks whether the setting change to the parameter group a can be performed, and transmits a Config_Change_Rsp message to the parameter adjustment node 10. The Config_Change_Rsp message transmitted here include a source ID, destination ID, and information indicating whether or not the setting change has been done successfully. In addition, when the setting change can performed, the information success is transmitted. When the setting change cannot be performed, the information failure is transmitted. When the setting change can be performed, the Config_Change_Rsp message including success is transmitted to the parameter adjustment node 10 after the setting change is performed in the streaming server 9.

With the reception of the Config_Change_Rsp message including success from the streaming server 9 as a trigger, the parameter adjustment node 10 transmits a Config_Change_Req message to the ASN gateway 4. In this case, the message conveys a parameter group b representing the parameters requiring setting change in the ASN gateway 4. The parameter group b includes the bandwidth and the like.

Upon receiving the Config_Change_Req message, the ASN gateway 4 checks whether setting to the parameter group b can be performed, and transmits the Config_Change_Rsp message to the parameter adjustment node 10. The Config_Change_Rsp message has similar configuration to that of the Config_Change_Rsp message transmitted from the streaming server 9. When the message including information indicating success is to be transmitted, the ASN gateway 4 is set to the parameters in the parameter group b, before the transmission of the message.

With the reception of the Config_Change_Rsp message including success from the ASN gateway 4 as a trigger, parameter adjustment node 10 transmits a Config_Change_Req message to the base station 3. The message includes a parameter group c such as the bandwidth, encoding rate, modulation method etc, for which setting change is to be performed in the base station 3. There are two units of the base stations in FIG. 16, i.e., the base stations 3a and 3b. The parameter adjustment node 10 transmits the Config_Change_Req message to both base stations 3a and 3b simultaneously.

Upon receiving the Config_Change_Req message, the base stations 3 (3a and 3b) check whether or not setting to the parameter group c can be performed, and transmits a Config_Change_Rsp message to the parameter adjustment node 10. The Config_Change_Rsp message includes a source ID, destination ID, information indicating whether or not the setting change has been done successfully, as well as the contents ID of the contents distributed by the multicast distribution. When the setting to the parameter group c can be performed, the base station 3 transmits the Config_Change_Rsp message including information indicating success to the parameter adjustment node 10, after the setting is performed.

Upon receiving the Config_Change_Rsp message including information indicating success from both base stations 3a and 3b, the parameter adjustment node 10 determines that the parameter setting change has been done successfully in each node.

Thus, by performing setting change of a node with the success of setting change in another node as a trigger, the parameter setting change for performing multicast distribution to the mobile station 1 located in the MCBCS zone 8 can be performed effectively for each node.

Meanwhile, upon receiving a Config_Change_Rsp message including information indicating failure from either of the streaming server 9, ASN gateway 4 or the base station 3, the parameter adjustment node 10 recalculate the parameter. At this time, the parameter setting control unit in the parameter adjustment node 10 analyzes the Config_Change_Rsp message and checks whether or not each node has been set to the setting-change parameter successfully.

Operations of Nodes in Embodiments (1)

The operations of the entire system including the parameter adjustment node 10 in embodiment (1) have been described above. Here, the operations of each node in performing parameter setting change are described, using flowcharts.

{Operations of the Parameter Adjustment Node}

Figure 18:
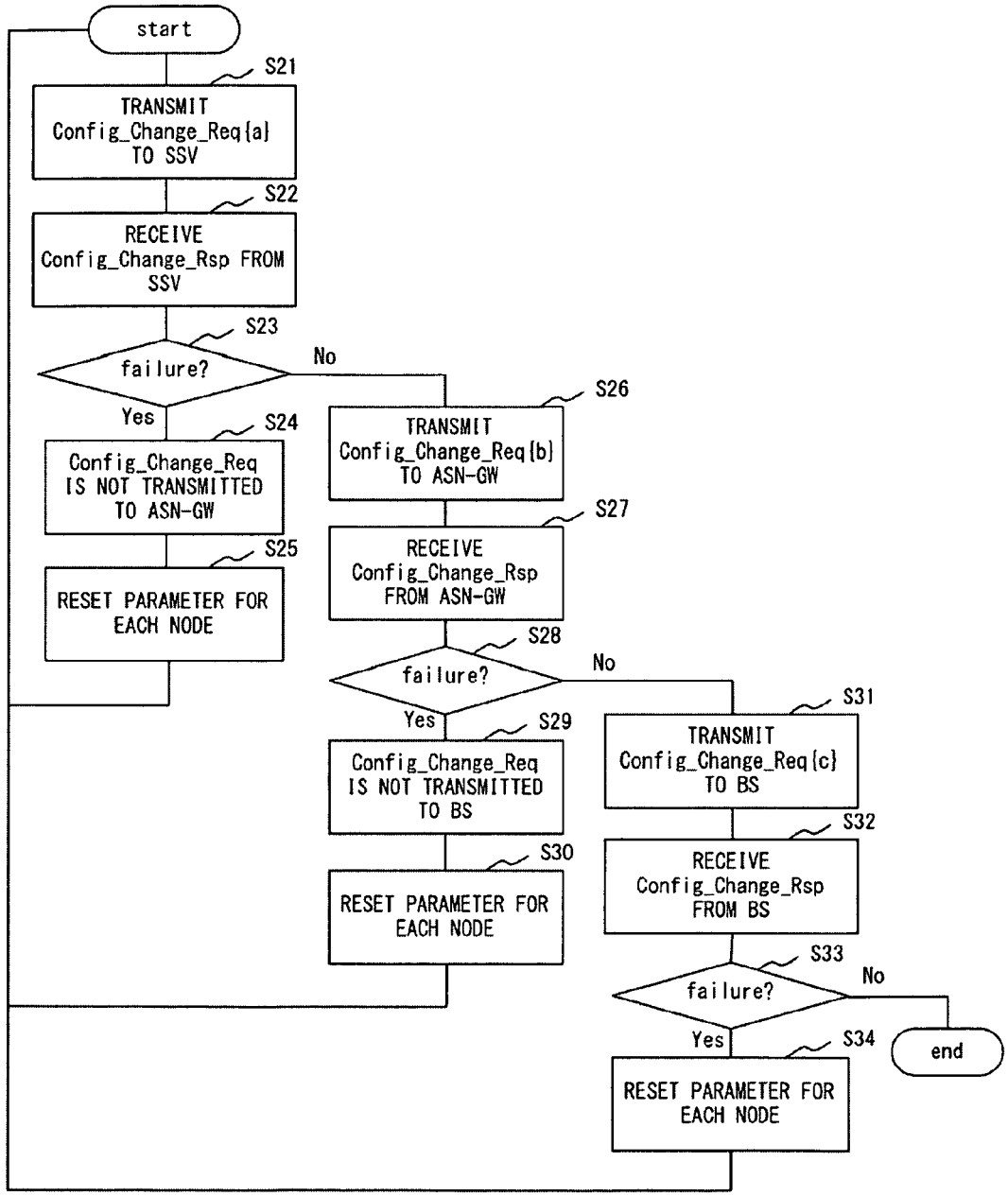
FIG. 18 is a flowchart illustrating the operations performed by the parameter adjustment node in the system according to the embodiment (1).

FIG. 18 is a flowchart illustrating the operations performed by the parameter adjustment node 10 in the system according to the embodiment (1). Upon selecting a setting-change parameter, the parameter adjustment node 10 determines for which of the nodes i.e., the streaming server 9, the ASN gateway 4 or the base station 3, the parameter should be set. Based on the determination, a Config_Change_Req message including the parameter group a is transmitted to the streaming server (SSV) 9, and a Config_Change_Rsp message is received from the streaming server 9 (steps S21, S22). The parameter setting control unit analyzes the Config_Change_Rsp message, and checks whether or not the setting in the streaming server 9 has been done successfully (step S23). When the received message contains failure, the transmission of the Config_Change_Req message to the ASN gateway (ASN-GW) 4 is cancelled, and setting-change parameters for each node are reset (step S23-S25).

Meanwhile, when the message received by the parameter adjustment node 10 indicates success, a Config_Change_Req message including the parameter group b is transmitted to the ASN gateway 4 (steps S23, S26). Upon receiving a Config_Change_Rsp message from the ASN gateway 4, the parameter setting control unit checks whether the message indicates failure (step S28). If a plurality of messages are received and there is any message indicating failure in the received messages, the transmission of the Config_Change_

Req message to the base station (BS) 3 is cancelled, and setting-change parameters for each node are set again (steps S29 and S30).

When the message received by the parameter adjustment node 10 from the ASN gateway 4 indicates success, a Config_Change_Req message including the parameter group c is transmitted to the base station 3 (steps S28, S31). Upon receiving a Config_Change_Rsq message from the base station 3, the parameter setting control unit checks whether the message contains information indicating failure (step S33). If a plurality of messages are received and there is any message indicating failure in the received messages, it is determined that the parameter setting has failed, and parameters for each node are reset (step S34). Meanwhile, if the Config_Change_Rsq indicates success, it is determined that the parameter setting has been done successfully (step S33).

{Operations of the Streaming Server}

Figure 19:
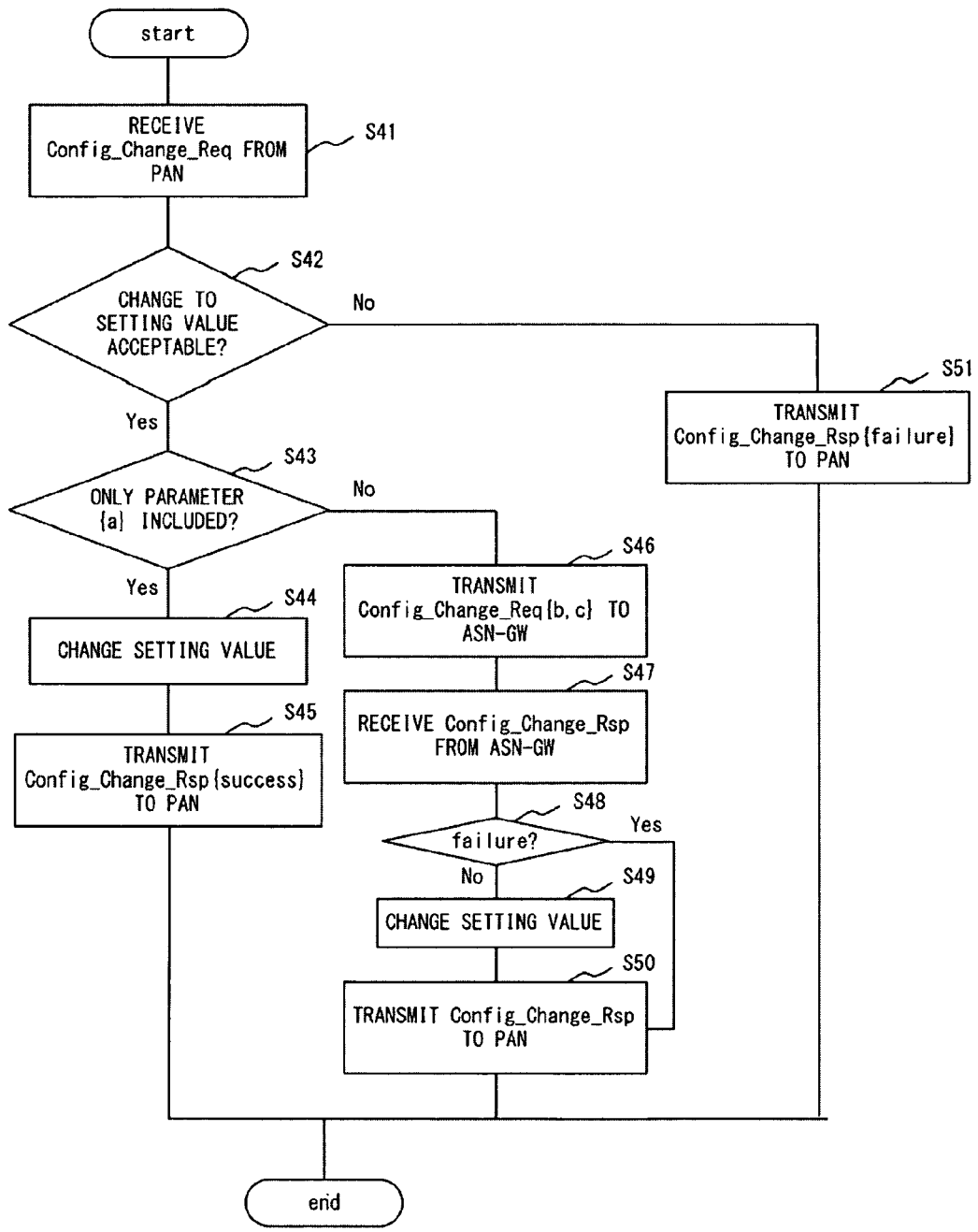
FIG. 19 is a flowchart illustrating the operations performed by the streaming server to which the setting-change parameters are transmitted.

FIG. 19 is a flowchart illustrating the operations performed by the streaming server 9 to which the setting-change parameters are transmitted. Upon receiving a Config_Change_Req message from the parameter adjustment node (PAN) 10, the streaming server 9 checks whether setting value change to the parameter group a can be performed (steps S41, S42).

When setting change to the parameter group a can be performed, whether the parameter group a is the only parameter group that has been transmitted from the parameter adjustment node 10 is checked (step S43). The operations (steps S46-S50) in the case in which a parameter group other than the parameter group a is included are explained in embodiment (4). When the received message include the parameter group a only, the setting to the parameter group a is performed, and a Config_Change_Rsp message including information indicating success is transmitted to the parameter adjustment node 10 (step S44, S45).

Meanwhile, when the streaming server 9 cannot be set to the transmitted parameter group a, the streaming server 9 transmits a Config_Change_Rsp message including information representing failure to the parameter adjustment node 10 (step S51).

{Operations of the ASN Gateway}

Figure 20:
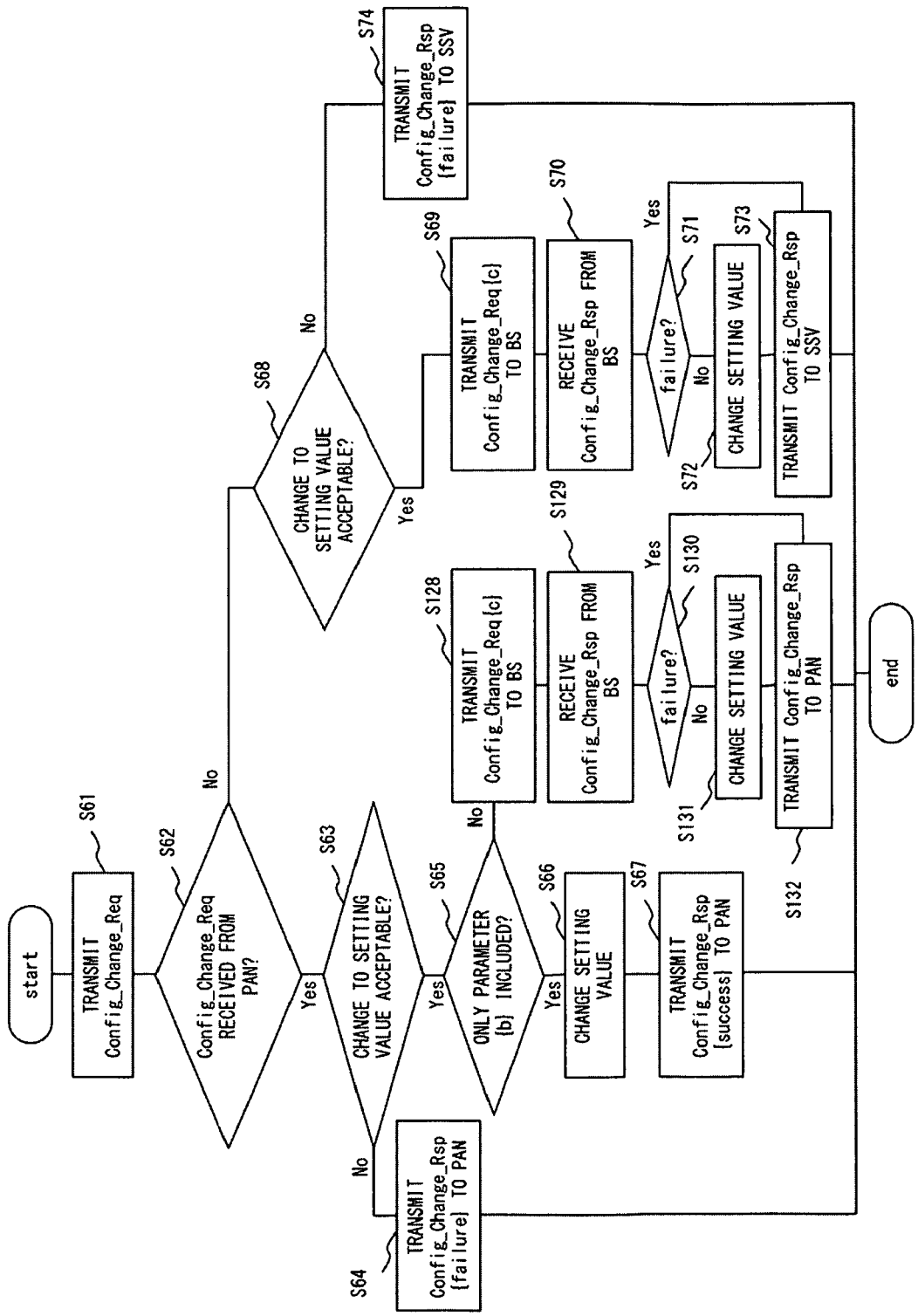
FIG. 20 is a flowchart illustrating the operations performed by the ASN gateway to which the setting-change parameters are transmitted.

FIG. 20 is a flowchart illustrating the operations performed by the ASN gateway 4 to which the setting-change parameters are transmitted. Upon receiving a Config_Change_Req message, the ASN gateway 4 checks whether the message was received from the parameter adjustment node 10, on the basis of the source ID of the message (steps S61, S62). The operations in the case in which the Config_Change_Req message was received from a node other than the parameter adjustment node 10 is described in embodiment (4) (steps S68-74). When the message was received from the parameter adjustment node 10, the ASN gateway 4 checks whether setting to the parameter group b included in the message can be performed (step S63).

When setting change to the parameter group b can be performed, whether the parameter group b is the only parameter group that has been transmitted from the parameter adjustment node 10 is checked (step S65). The case in which the parameter group c is included in the Config_Change_Req message is explained in embodiments (2) and (3) (steps S128-S132). When the received message includes the parameter group b only according to the check, the setting to the parameter group b is performed, and a Config_Change_Rsp message including information indicating success is transmitted to the parameter adjustment node 10 (step S66, S67).

Meanwhile, when the change to the transmitted parameter group b cannot be performed, the ASN gateway 4 transmits a Config_Change_Rsp message including information representing failure to the parameter adjustment node 10 (step S64).

{Operations of the Base Station}

Figure 21:
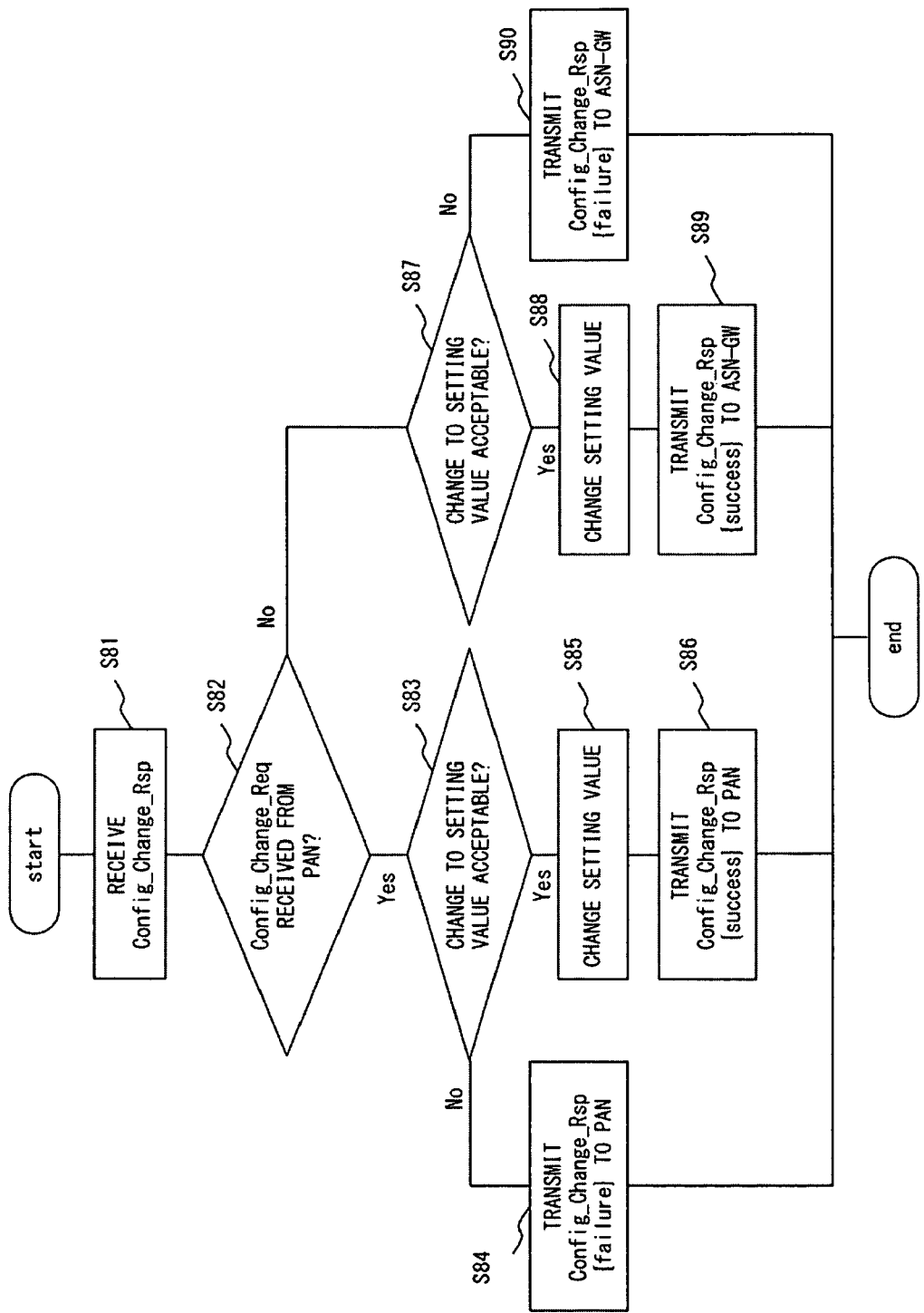
FIG. 21 is a flowchart illustrating the operations performed by the base station to which the setting-change parameters are transmitted.

FIG. 21 is a flowchart illustrating the operations performed by the base station 3 to which the setting-change parameters are transmitted. Upon receiving a Config_Change_Req message, the base station 3 checks from which node the message was received, by checking the source ID of the message (step S81, S82). The operations in the case in which the Config_Change_Req message was received from a node other than the parameter adjustment node 10 is described later (steps S87-S90).

When the Config_Change_Req message was received from the parameter adjustment node 10, the base station 3 checks whether the setting values can be changed to the transmitted parameter group c (step S83). When setting change to the transmitted parameter group c cannot be performed, a Config_Change_Rsp message including information representing failure is transmitted to the parameter adjustment node 10 (step S84).

When setting change to the transmitted parameter group c can be performed, the setting to the parameter group c is performed, and the base station 3 transmits a Config_Change_Rsp message including information representing success to the parameter adjustment node 10 (steps S85, S86).

Adopting the system in which each node operates as describe above, suitable distribution can be performed consistently in accordance with the reception state of the mobile station 1, by setting the parameters that are selected collectively by the parameter adjustment node 10 for each node.

Embodiment (2)

While the parameter adjustment node 10 performed the transmission/reception of messages with the subordinate base stations 3 individually in the system illustrated in embodiment (1), the configuration may also be made so that the ASN gateway 4 controls the parameter setting of the respective subordinate base station 3. Even in such a case, the report of the received frame rate from the mobile station 1 and the calculation of the parameter in the parameter adjustment node 10 are performed as described in embodiment (1).

Figure 22:
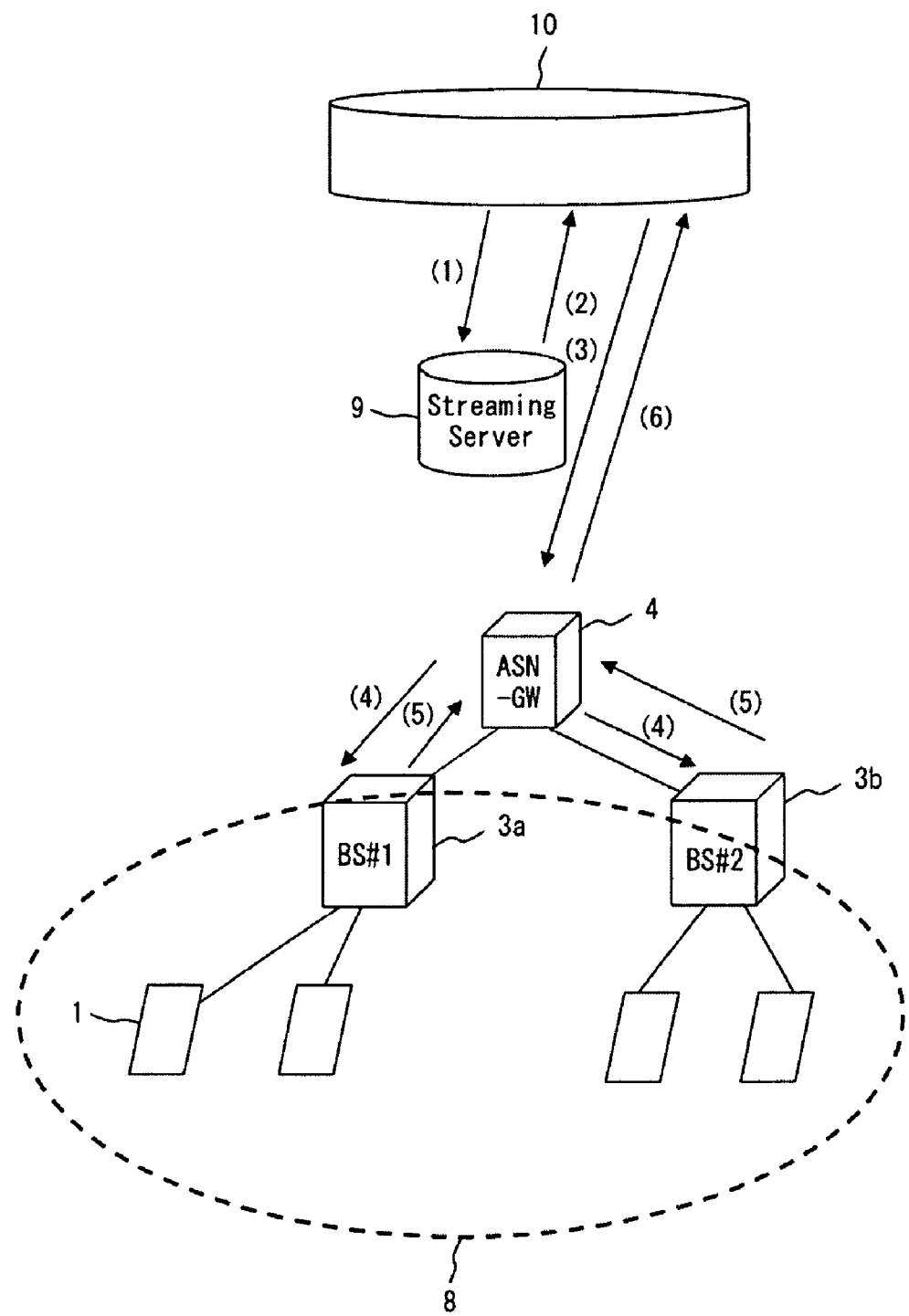
FIG. 22 is a diagram illustrating the process in which each node is set to setting-change parameters in the system according to embodiment (2).
Figure 23:
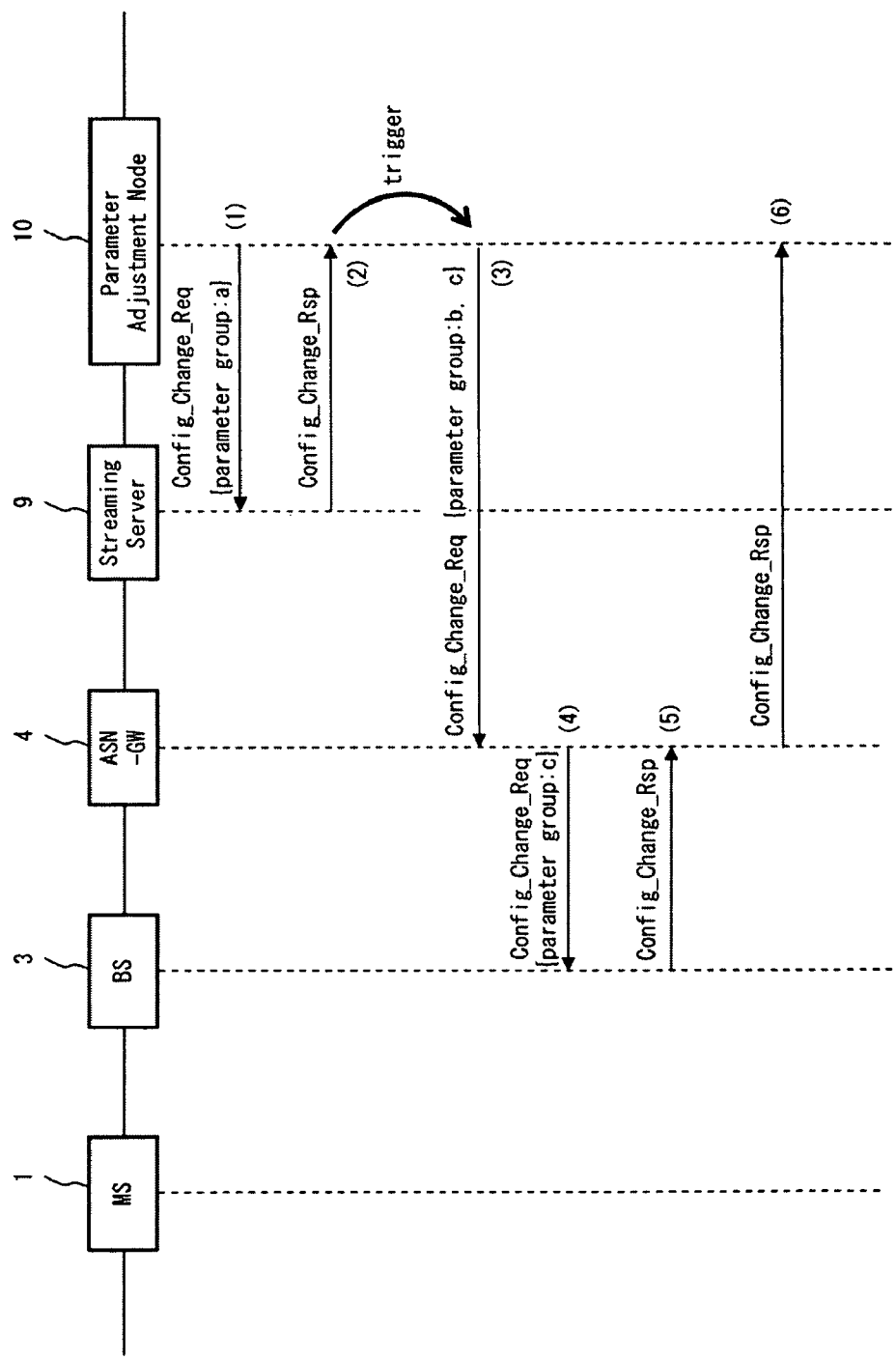
FIG. 23 is a sequence diagram illustrating the process in which each node is set to setting-change parameters in the system according to embodiment (2).

FIG. 22 is a diagram illustrating the process in which each node is set to setting-change parameters in the system according to embodiment (2). FIG. 23 is a sequence diagram of the process. Hereinafter, the procedures for performing the notification and setting of setting-change parameters are described, referring to FIGS. 22 and 23. Without particular note, the message transmitted/received in embodiment (2) is supposed to have similar configuration to the message configuration described in embodiment (1).

The parameter adjustment node 10 transmits a Config_Change_Req message to the streaming server 9 to notify that a parameter change is required. The parameters to be transmitted here are parameter group a.

Upon receiving the Config_Change_Req message, the streaming server 9 checks whether setting change to the parameter group a can be performed, and transmits a Config_Change_Rsp message to the parameter adjustment node 10. When the setting change can be performed, the Config_Change_Rsp message including success is transmitted to the parameter adjustment node 10 after the setting change is performed in the streaming server 9.

With the reception of the Config_Change_Rsp message including success from the streaming server 9 as a trigger, the parameter adjustment node 10 transmits a Config_Change_

Req message to the ASN gateway 4. While the message has similar configuration to the Config_Change_Req message described above, it includes the parameter group b to be used for the setting change of the ASN gateway 4, and the parameter group c to be used for the setting change of the base station 3.

Upon receiving the Config_Change_Req message including the parameter group b and c, the ASN gateway 4 recognizes, among the parameters included in the message, the parameter group b that is to be used for the setting change of the ASN gateway 4. Next, whether the setting to the parameter group b can be performed is checked, and when the setting can be performed, a Config_Change_Req message is transmitted to the subordinate base station 3. The Config_Change_Req message transmitted to the base station 3 includes the parameter group c. In the example illustrated in FIG. 22, two units of the base station 3 are disposed under the ASN gateway 4. In such a case, the ASN gateway 4 transmits the Config_Change_Req to the two subordinate base stations 3 simultaneously. The ASN gateway 4 may be configured to transmit the Config_Change_Req message before the setting to the parameter group b is performed, or to transmit the message to the base station 3 after the setting is performed in the ASN gateway 4 itself. Described here are the operations in the case in which the Config_Change_Req message is transmitted before the setting to the parameter group b is performed.

Upon receiving the Config_Change_Req message, each base station 3 checks whether the setting to the parameter group c can be performed. When the setting can be performed, the base station 3 sets itself to the parameter group c, and transmits a Config_Change_Rsp message including information indicating success to the ASN gateway 4.

Upon receiving the Config_Change_Rsp message including information indicating success from the subordinate base station 3, the ASN gateway 4 sets itself to the parameter group b. After performing the setting for itself, the ASN gateway 4 transmits the Config_Change_Rsp message received from the base station 3 to the parameter adjustment node 10.

Upon receiving the Config_Change_Rsp of which source is the ASN gateway 4 and which includes information indicating success, the parameter adjustment node 10 recognizes that the parameter setting change has been done successfully.

By adopting the configuration described above, the number of messages to be transmitted/received can be reduced, and even when there are a number of subordinate nodes, less amount of communication is required for the parameter setting, compared to embodiment (1). In the system illustrated in embodiment (1), the parameter adjustment node 10 performs the message transmission/reception with a subordinate base station 3 individually. Therefore, as the number of subordinate base stations 3 and ASN gateways 4 increases, the parameter adjustment node 10 transmits/received more messages. Then, by adopting the system having the configuration described in embodiment (2), the number of messages handled by the parameter adjustment node 10 can be reduced, thereby reducing the load for the parameter adjustment node 10.

Embodiment (3)

In the case described in embodiment (2) above, it is supposed that setting to the transmitted setting-change parameters can be performed in all nodes. The configuration of embodiment (2) differs from the case described in embodiment (1) in that the parameter adjustment node 10 transmits parameters to a subordinate base station 3 by transmitting a message to the ASN gateway 4. In this regard, in order to distribute the same contents at the same time with the same quality to the mobile stations 1 located in the same MCBCS zone 8, the same parameters need to be set for the ASN gateways 4 and the base stations 3 constituting an MCBCS zone 8. For this reason, if any one of the nodes cannot be set to the transmitted parameters, the parameter adjustment node 10 recalculates the parameters as described above. Described below are the processes performed when a plurality of ASN gateways 4 and the base stations 3 constitute an MCBCS zone 8 and setting cannot be done in one of the ASN gateways 4 or one of the base stations 3. In the same manner as in embodiment (2), this example describes the operations in a case in which the ASN gateway 4 transmits a Config_Change_Req message before it performs the setting to the parameter group b. Even in such a case, the report of the reception frame rate from the mobile station 1 and the calculation of the parameter in the parameter adjustment node 10 are performed as described in embodiment (1). The configuration of each message is similar to that described in embodiment (2).

Figure 24:
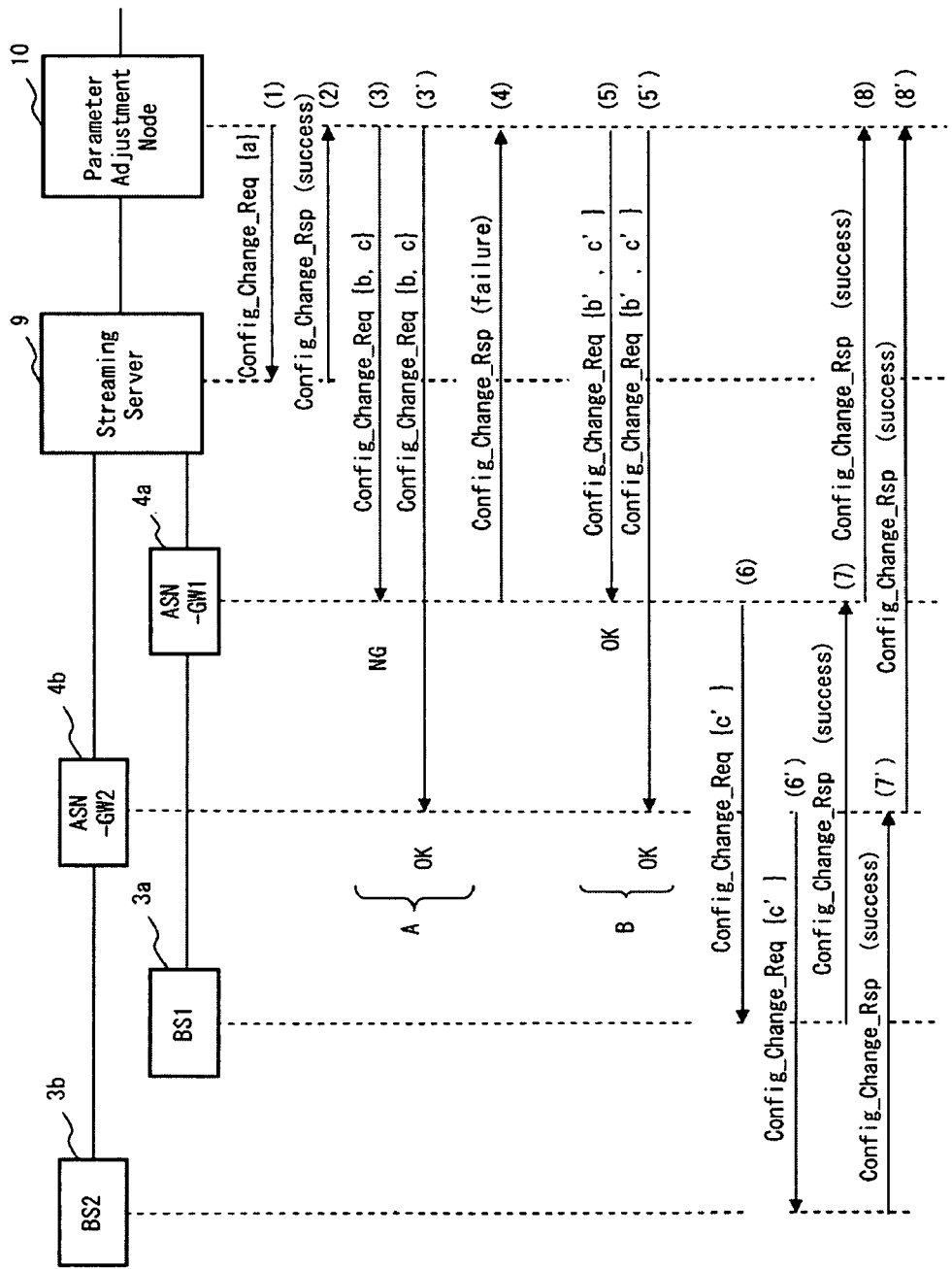
FIG. 24 is a sequence diagram of setting of each node to recalculated parameters.

FIG. 24 illustrates a sequence diagram of setting of each node to recalculated parameters. FIG. 24 is a sequence diagram of parameter setting performed for an MCBCS zone 8 that is formed by two units of the ASN gateway 4 (4a and 4b) and the base stations 3 (3a and 3b) respectively disposed under each of the ASN gateways 4. Messages transmitted in procedures (3) and (3') marked with "A" are the messages to transmit parameters calculated by the parameter adjustment node 10 at the first time. It is assumed that in procedures (5) and (5') marked with "B", parameters recalculated by the parameter adjustment node 10 are transmitted to each node. While a case in which the setting change fails in the ASN gateway 4a and the setting change can be performed in the ASN gateway 4b is described here as an example, similar operations are to be performed in a case in which the setting change cannot be performed in the base station 3. In addition, more than one units of the base station 3 may be disposed under each ASN gateway 4. While the mobile station 1 is omitted in FIG. 24, any number of the mobile stations 1 may be located in the MCBCS zone 8.

Procedures (1) and (2) in the present embodiment are the same as procedures (1) and (2) described in embodiment (2).

(3), (3') With the reception of the Config_Change_Rsp message including success from the streaming server 9 as a trigger, the parameter adjustment node 10 transmits Config_Change_Req messages to the ASN gateways 4a and 4b. At this time, the parameter adjustment node 10 transmits messages including the same parameter groups b and c simultaneously to the ASN gateways 4a and 4b.

Since the setting to the parameter group b cannot be performed in the ASN gateway 4a, the ASN gateway 4a transmits a Config_Change_Rsp message including information indicating failure to the parameter adjustment node 10.

Upon receiving the Config_Change_Rsp message including information indicating failure from the ASN gateway 4a, the parameter adjustment node 10 recognizes that recalculation of parameters is required, since there is a node for which the parameter group b cannot be set. In the same manner as in embodiment (1), whether or not each node has been set to the setting-change parameters successfully is checked by the parameter setting control unit.

(5), (5') The parameter adjustment node 10 transmits Config_Change_Req messages including the parameters b' and c' obtained by the recalculation, to the ASN gateways 4a and 4b. The ASN gateways 4a and 4b checks whether setting to the transmitted parameter group b' can be performed. In this case, it is assumed that the setting change can be performed for both of the ASN gateways 4*a* and 4*b*.

(6), (6') The ASN gateways 4*a* and 4*b* respectively transmits a Config_Change_Req message to the respective subordinate base stations 3 (3*a* and 3*b*). It is assumed that the message includes the parameter group c'. At this time, there is a possibility that, depending on the result of the recalculation by the parameter adjustment node 10, the parameter group c' consists of the same parameters as those in the parameter group c that was transmitted to the ASN gateway 4 at the first time.

(7), (7') Upon receiving the Config_Change_Req message, the base stations 3*a* and 3*b* checks whether the setting to the transmitted parameter group c' can be performed for themselves. When the setting can be performed, each nodes are set to the parameter group c, and a Config_Change_Rsp message including information indicating success is transmitted to the ASN gateway 4*a* or 4*b*.

(8), (8') Upon receiving the Config_Change_Rsp message including information indicating success from the subordinate base station 3*a* or 3*b*, the ASN gateways 4*a* and 4*b* respectively performs the setting to the parameter group b'. After performing the setting change, the ASN gateways 4*a* and 4*b* transmit the received Config_Change_Rsp message to the parameter adjustment node 10.

Upon receiving, from the ASN gateways 4*a* and 4*b*, the Config_Change_Rsp message of which source is the ASN gateway 4*a* or 4*b* and which includes information indicating success, the parameter adjustment node 10 determines that the parameter setting change has been done successfully.

By adopting the system as described above, setting-change parameters can be calculated collectively by the parameter adjustment node 10, cutting unnecessary setting-change operations and reducing load for each node.

[Operations of Nodes in Embodiments (2) and (3)]

Hereinafter, operations performed by the nodes used in the system described in embodiments (2) and (3) in performing parameter setting change are described, for each of the nodes. The operations of the streaming server 9 in embodiments (2) and (3) are similar to the operations described in embodiment (1).

{Operations of the Parameter Adjustment Node}

Figure 25:
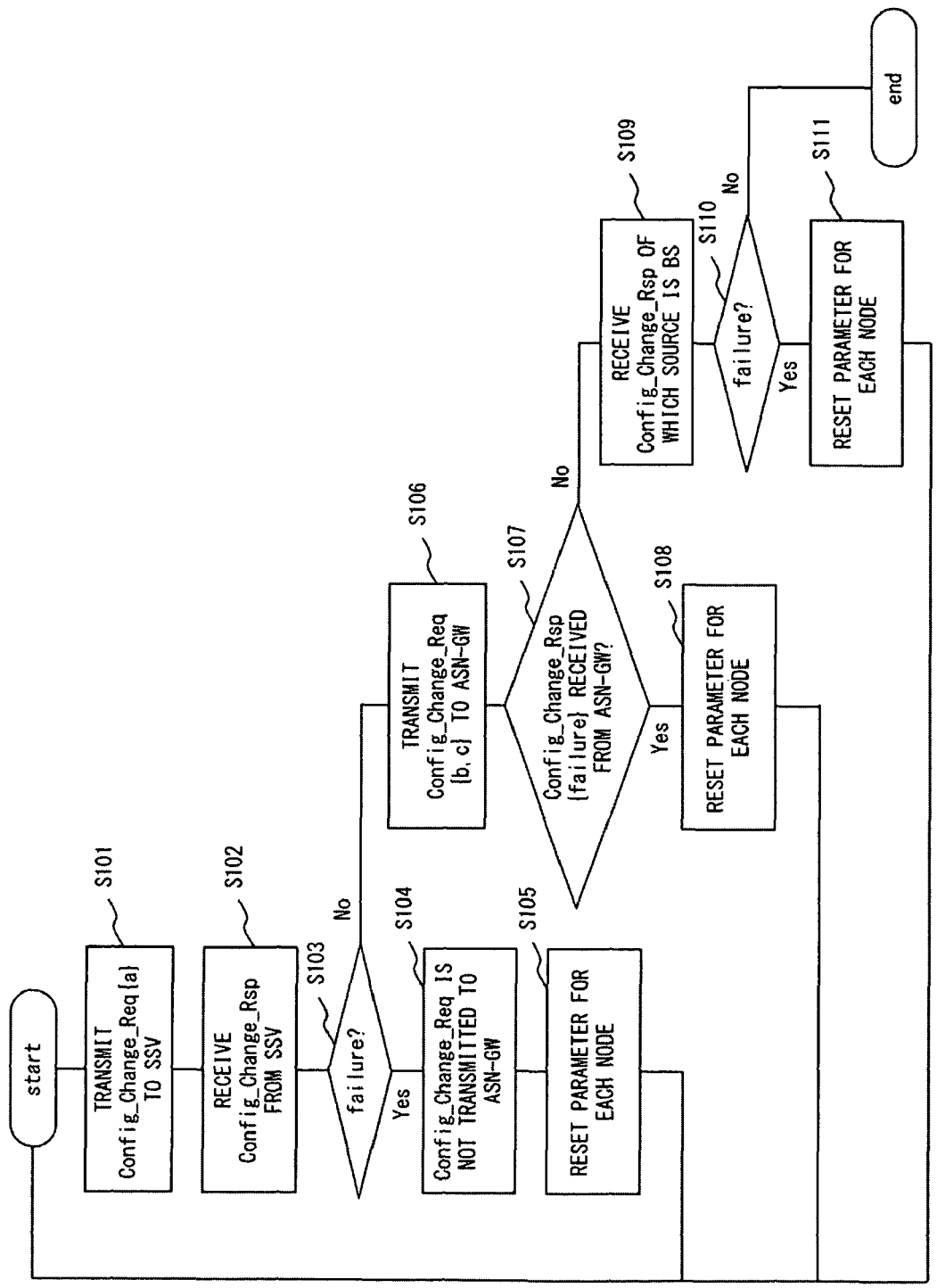
FIG. 25 is a flowchart describing the operations performed by the parameter adjustment node in the system according to embodiment (2) or (3).

FIG. 25 is a flowchart describing the operations performed by the parameter adjustment node 10 used in the system according to embodiment (2) or (3). A series of operations (steps S101-S105) including transmission/reception of messages to/from the streaming server 9 after the calculation of setting-change parameters and recalculation of setting parameters due to a failure in setting change are similar to the steps S21-S25 described in embodiment (1) referring to FIG. 18.

Meanwhile, when the parameter setting in the streaming server 9 succeeds, the parameter adjustment node 10 receives a Config_Change_Rsp message indicating success. In this case, a Config_Change_Req message including the parameter groups b and c is transmitted to the ASN gateway 4 (steps S103, S106). Upon receiving a Config_Change_Rsp message of which source is the ASN gateway 4, the parameter setting control unit checks whether the message indicates failure (step S107). If the message represents failure, the parameter adjustment node 10 recognizes that recalculation of parameters is required, and recalculates the parameter groups b and c (step S108). The configuration may also be made so that the parameter groups a, b and c are recalculated.

When the parameter adjustment node 10 receives a Config_Change_Rsp message of which source is the base station 3 via the ASN gateway 4, the message may indicate either success or failure. Therefore, upon receiving a Config_Change_Rsp message via the ASN gateway 4, the parameter adjustment node 10 checks whether the message indicates failure (step S110). If the received message indicates success, the success of the parameter setting change is recognized. On the other hand, if any of the Config_Change_Rsp messages received via the ASN gateway 4 indicates failure, the parameter adjustment node 10 recalculates the parameters (step S111).

{Operations of the ASN Gateway}

The operations performed by the ASN gateway 4 in the system according to the embodiment (2) or (3) are described, referring to FIG. 20. Upon receiving a Config_Change_Req message from the parameter adjustment node 10, similar operations to the steps S61-S65 described in embodiment (1) are performed. When setting to the parameter group b transmitted for the setting change for the ASN gateway 4 can be performed, the ASN gateway 4 checks whether the received message includes the parameter group c that is to be used for the setting of the subordinate base station 3 (step S65). When a Config_Change_Req message including the parameter group c has been received, a Config_Change_Req message including the parameter group c is generated and transmitted to the subordinate base station 3 (step S128). Upon receiving a Config_Change_Rsp message from the subordinate base station 3, whether the message indicates success or failure is checked (steps S129, S130).

When the message received from the base station 3 indicates failure, the message is transmitted to the parameter adjustment node 10 (steps S130, S132).

When the message received from the base station 3 indicates success, the ASN gateway 4 sets itself to the parameter group b, and transmits a Config_Change_Rsp message to the parameter adjustment node 10 (steps S130-132).

Meanwhile, when the setting with the parameter group b transmitted from the parameter adjustment node 10 cannot be performed, the operations are the same as the case when a Config_Change_Req message that does not include the parameter group c is received. In other words, upon recognizing that the setting to the parameter group b cannot be performed, the ASN gateway 4 transmits a Config_Change_Rsp message including information indicating failure to the parameter adjustment node 10 (steps S63, S64).

{Operations of the Base Station}

Next, the operations performed by the base station 3 in the system according to embodiment (2) or (3) are described in detail, referring to FIG. 21. Upon receiving a Config_Change_Req message, the base station 3 checks the source of the message first (steps S81, S82). When the source is the parameter adjustment node 10, the operations described in embodiment (1) is performed.

Meanwhile, when the source of the Config_Change_Req message is the ASN gateway 4, operations in the system according to embodiment (2) or (3) are performed (steps S87-S90). The base station 3 checks whether setting change to the parameter group c can be performed, and when the setting change can be performed, the set values are changed to the parameter group c (steps S87, S88). Then, the base station 3 transmits a Config_Change_Rsp message including information indicating success to the ASN gateway 4 (step S89).

When the base station 3 cannot be set to the transmitted parameter group c, a Config_Change_Rsp message including information indicating failure is transmitted to the ASN gateway 4 (step S90).

By adopting the system in which each node operates as described above, the data transmission condition from the server to the mobile station 1 can be set in accordance with the data reception state of the mobile station 1 in the similar way to embodiment (1), while reducing the amount of communication required for the setting.

Embodiment (4)

Hereinafter, a system in which the parameter adjustment node 10 mainly performs communication with the streaming server 9 in order to further reduce the number of messages transmitted/received by the parameter adjustment node 10 is described, as embodiment (4).

Figure 26:
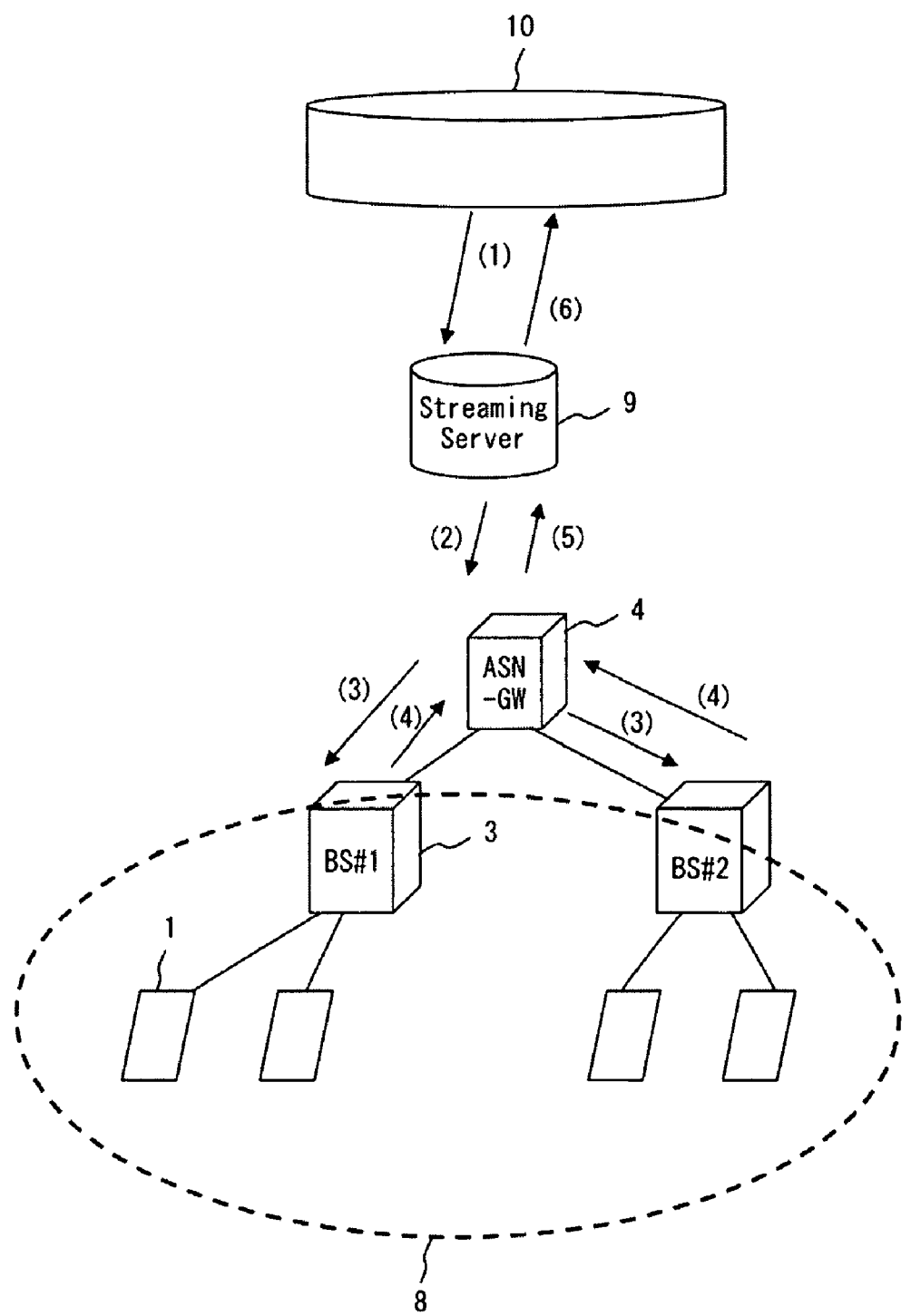
FIG. 26 is a diagram illustrating the process in which each node is set to setting-change parameters in the system according to embodiment (4).

FIG. 26 is a diagram illustrating the process in which each node is set to setting-change parameters in the system according to embodiment (4). FIG. 27 is a sequence diagram of the process. Hereinafter, the procedures for performing the notification and setting of setting-change parameters are described, referring to FIGS. 26 and 27. Without particular note, the message transmitted/received in embodiment (4) is supposed to have similar configuration to the message configuration described in embodiments (1)-(3).

In the present embodiment, the report of the reception frame rate from the mobile station 1 and the calculation of the parameter in the parameter adjustment node 10 are performed as described in embodiment (1). After calculating setting-change parameters, the parameter adjustment node 10 transmits a Config_Change_Req message to the streaming server 9 to notify that a parameter change is required. The parameters to be transmitted here are parameter groups a, b and c.

Upon receiving the Config_Change_Req message, the streaming server 9 checks whether the setting change to the parameter group a can be performed, and transmits a Config_Change_Rsp message to the ASN gateway 4 when the setting can be performed. The parameter groups b and c are included in the Config_Change_Rsp message at this time.

The streaming server 9 may be configured to transmit the Config_Change_Req message before the setting to the parameter group a is performed, or to transmit the message to the ASN gateway 4 after the setting is performed in the streaming server 9 itself. Assumed here in the case in which the Config_Change_Req message is transmitted before the setting to the parameter group a is performed.

The operations of the ASN gateway 4 performed upon receiving a Config_Change_Req message including the parameter groups b and c are similar to the operations described in procedure (4) in embodiment (2). When the ASN gateway 4 can be set to the parameter group b, the ASN gateway 4 transmits a Config_Change_Req message including the parameter group c to the subordinate base station 3.

The operations of the base station 3 performed upon receiving the Config_Change_Req message including the parameter group c are similar to the operations described in procedure (5) in embodiment (2). When the setting to the parameter group c can be performed, the base station 3 performs the setting for itself, and transmits a Config_Change_sp message including information indicating success to the ASN gateway 4.

Upon receiving the Config_Change_Rsp message including information indicating success from the subordinate base station 3, the ASN gateway 4 sets itself to the parameter group b. After that, the ASN gateway 4 transmits the Config_Change_Rsp message received from the base station 3 to the streaming server 9.

Upon receiving the Config_Change_Rsp message including information indicating success from the subordinate ASN gateway 4, the streaming server 9 sets itself to the parameter group a. After that, the streaming server 9 transmits the Config_Change_Rsp message received from the ASN gateway 4 to the parameter adjustment node 10.

Upon receiving the Config_Change_Rsp message of which source is the streaming server 9 and includes information indicating success, the parameter adjustment node 10 recognizes that the parameter setting change has been done successfully.

By adopting the configuration described above, the data transmission condition from the server to the mobile station 1 can be set in real time, in a system that requires relatively less messages to be transmitted/received for the setting.

[Operations of Nodes in Embodiment (4)]

Hereinafter, operations of the nodes used in the system described in embodiment (4) in performing parameter setting change are described, using a flowchart for each of the nodes. The operations of the base station 3 in embodiment (4) are similar to the operations described in the relevant part in embodiment (3).

{Operations of the Parameter Adjustment Node}

FIG. 28 is a flowchart describing the operations performed by the parameter adjustment node 10 used in the system according to embodiment (4). After calculating setting-change parameters, the parameter adjustment node 10 first transmits a Config_Change_Req message storing the parameter groups a, b and c to the streaming server 9 (step S121). Upon receiving a Config_Change_Rsp message indicating failure with its source being the streaming server 9, the parameter adjustment node 10 recalculates the parameters for each node (steps S122, S123).

When any message indicating failure with its source being the streaming server 9 has not been received, the parameter adjustment node 10 checks whether a Config_Change_Rsp message of which source is the ASN gateway 4 has been received (steps S122. S124). Upon receiving a message indicating failure from the ASN gateway 4, the parameter adjustment node 10 recalculates the parameters (step S125).

When a message indicating failure has not been received from either of the nodes, i.e., the streaming server 9 and the ASN gateway 4, the parameter adjustment node 10 receives a Config_Change_Rsp message of which source is the base station 3. The parameter adjustment node 10 then checks whether the received message indicates failure (step S126). When a message indicating success is received, the parameter adjustment node 10 recognizes that the parameter setting change has been done successfully.

Meanwhile, when a message indicating failure with its source being the base station 3 is received, the parameter adjustment node 10 recalculates the parameters (step S127).

{Operations of the Streaming Server}

The operations performed by the streaming server 9 in the system according to embodiment (4) are described, referring to FIG. 19. Upon receiving a Config_Change_Req message including the parameter groups a, b and c from the parameter adjustment node 10, the streaming server 9 checks whether the setting value of the streaming server 9 itself can be changed to the parameter group a (steps S41, S42). When the setting to the parameter group a can be performed, whether or not parameters other than the parameter group a are included in the Config_Change_Req message is checked (step S43).

When a message including the parameter groups a, b and c is received, the streaming server 9 transmits a Config_Change_Req message including the parameter groups b and c to the subordinate ASN gateway 4 (step S46). Upon receiving the Config_Change_Rsp message from the ASN gateway 4, the streaming server 9 checks whether the received message indicates failure (steps S47, S48). When the message received from the ASN gateway 4 indicates failure, the streaming server 9 transmits a Config_Change_Rsp message to the parameter adjustment node 10 (steps S48, S50).

When the message received by the streaming server 9 from the ASN gateway 4 indicates success, the streaming server 9 sets itself to the parameter group a, and transmits a Config_Change_Rsp message to the parameter adjustment node 10 (steps S48-S50).

Meanwhile, when the setting change to the transmitted parameter group a cannot be performed in the streaming server 9, a Config_Change_Rsp message indicating failure is transmitted to the parameter adjustment node 10 (step S42, S51).

{Operations of the ASN Gateway}

Upon receiving a Config_Change_Req message, the ASN gateway 4 checks whether the message was received from the parameter adjusting node 10, as illustrated in FIG. 20 (steps S61, S62). When the message was not received from the parameter adjustment node 10, it follows that the ASN gateway 4 received the Config_Change_Req message from the streaming server 9. In this case, the ASN gateway 4 has received the message including the parameter group b used for the setting change of the ASN gateway 4 itself and the parameter group c to be used for setting change of the base station 3.

Upon receiving the message from the streaming server 9, the ASN gateway 4 checks whether the setting to the parameter group b can be performed (step S68). When the setting to the parameter group b can be performed, the ASN gateway 4 transmits a Config_Change_Req message to the subordinate base station, and performs the setting change for the ASN gateway 4 itself as needed, in the similar way to that described in embodiments (2) and (3) (steps S69-S73).

Meanwhile, when the ASN gateway 4 cannot be set to the parameter group b, a Config_Change_Rsp message indicating failure is transmitted to the streaming server 9 (steps S68, S74).

The case in which the ASN gateway 4 receives the Config_Change_Req message from the parameter adjustment node 10 corresponds to either of embodiments (1)-(3) described above.

Embodiment (5)

In the embodiments above, mainly illustrated were the operations of a system that performs the setting from the server to the mobile station 1 in real time. In the present embodiment, a specific example is provided for changing parameters for distributing the same contents as information having the same quality in accordance with the arrangement of a plurality of mobile stations 1 located in the MCBCS zone 8.

Figure 29:
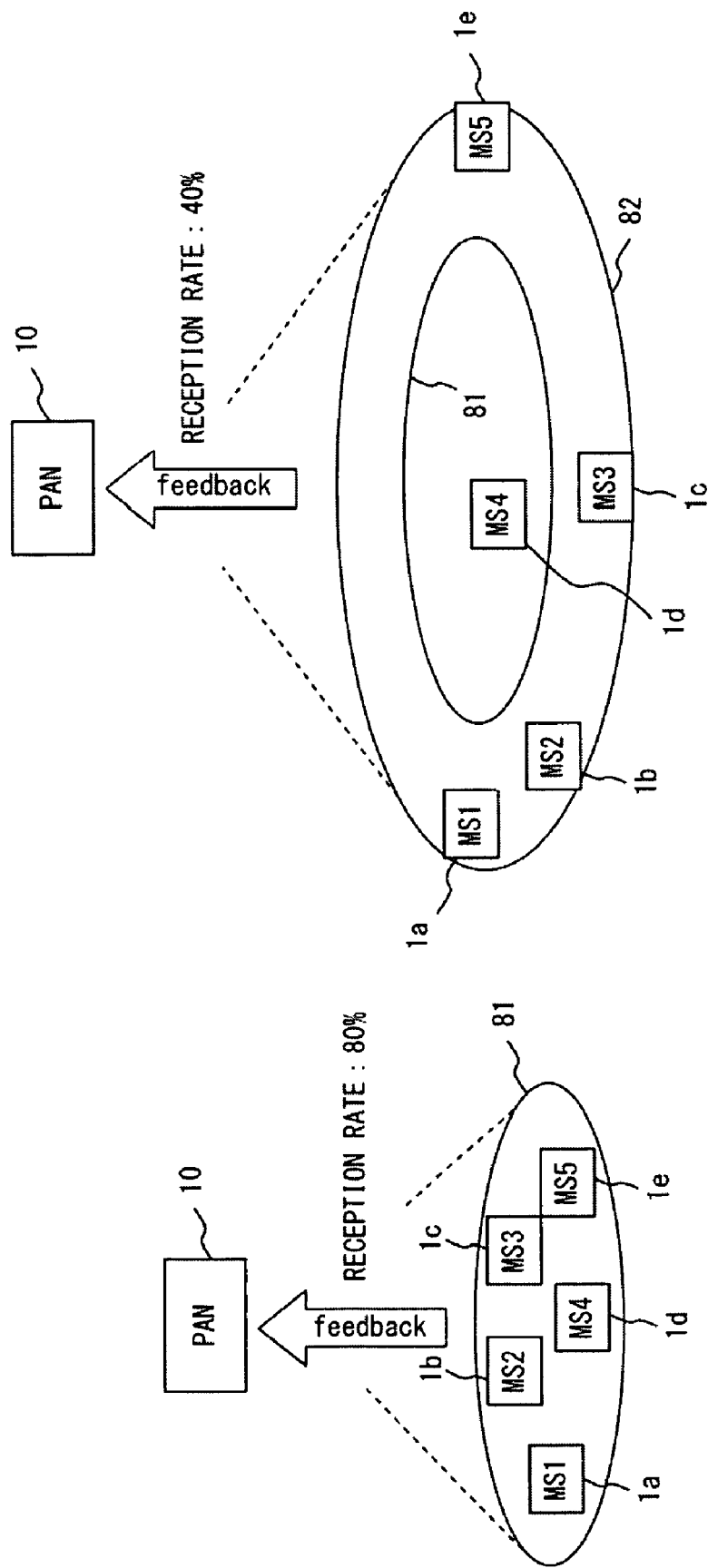
FIG. 29A is a diagram representing an example of parameter adjustment performed by the parameter adjustment node in accordance with the reception rate of a plurality of mobile stations.
FIG. 29B is a diagram representing an example of parameter adjustment performed by the parameter adjustment node in accordance with the reception rate of a plurality of mobile stations.

FIGS. 29A and 29B are diagrams illustrating example of parameter adjustment performed by the parameter adjustment node 10 in accordance with the reception rate of a plurality of mobile stations 1. The example discussed here illustrates a case in which five units of mobile station 1 are located in the MCBCS zone 8. The distribution target y for the mobile station 1 is assumed to be 60%, and the adjustment threshold value ya is assumed to be 70%. The nodes located between the parameter adjustment node 10 and the mobile stations 1 are omitted in FIGS. 29A and 29B.

In the condition illustrated in FIG. 29A, all of the mobile stations 1 are located in an area 81 in the MCBCS zone 8 that is close to the base station (not represented in the drawing). In addition, the parameters used for the distribution are supposed to be MPEG1, 64 QAM, and the reception rate is supposed to be 80%. At this time, the reception rate seems to be higher than the adjustment threshold value ya because the received information quality is low. Therefore, the system performs an adjustment so as to increase the received information quality and to make the reception rate settle within the range of 60-70%. The parameters set for each of the nodes, i.e., the streaming server 9, the ASN gateway 4, and the base station 3, are referred to as a parameter group K.

It is assumed here that while the multicast using the parameter group K is continued, the condition changed as illustrated in FIG. 29B, where the mobile station 1d has made almost no movement at all and is located in the area 81 close to the base station, whereas the mobile stations 1a, 1b, 1c and 1e have moved to the area 82 that is away from the base station 3. In such a case, the reception rate of the mobile stations 1a, 1b, 1c and 1e having moved away from the base station becomes lower, compared to their reception rate at the time when they were located in the area 81 close to the base station 3. At this time, it is supposed in FIG. 29B that the reception rate of the mobile stations decreased to 40%. In such a case, the parameter adjustment node 10 changes the received information quality so as to make the reception rate of the mobile stations within the range of 60-70%.

Thus, setting of the optimal parameters for the multicast distribution can be performed in real time for all nodes including the streaming server 9 through the mobile station 1, in accordance with the change in the reception rate of all the mobile stations 1 located in the MCBCS zone 8 due to the movements of the mobile stations 1.

The present embodiment is not limited to the above configuration, and can be modified in various ways. Some examples of the modification are described below.

Feedback at the IEEE802.16e Level

In the embodiments above, the mobile station 1 performed the feedback at the application level. However as mentioned in the description of the mobile station 1, the mobile station 1 is also capable of performing feedback at the IEEE802.16e level. Any of the embodiments described above can be configured so that the parameter adjustment node 10 calculates the reception level using the feedback performed by the mobile station 1 at the IEEE802.16e level. In addition, the mobile station 1 may be configured to perform both of the feedback at the application level and the feedback at the IEEE802.16e level so as to increase the amount of information available for the parameter adjustment node 10. The method for performing the feedback at the IEEE802.16e level is described in detail below.

Figure 30:
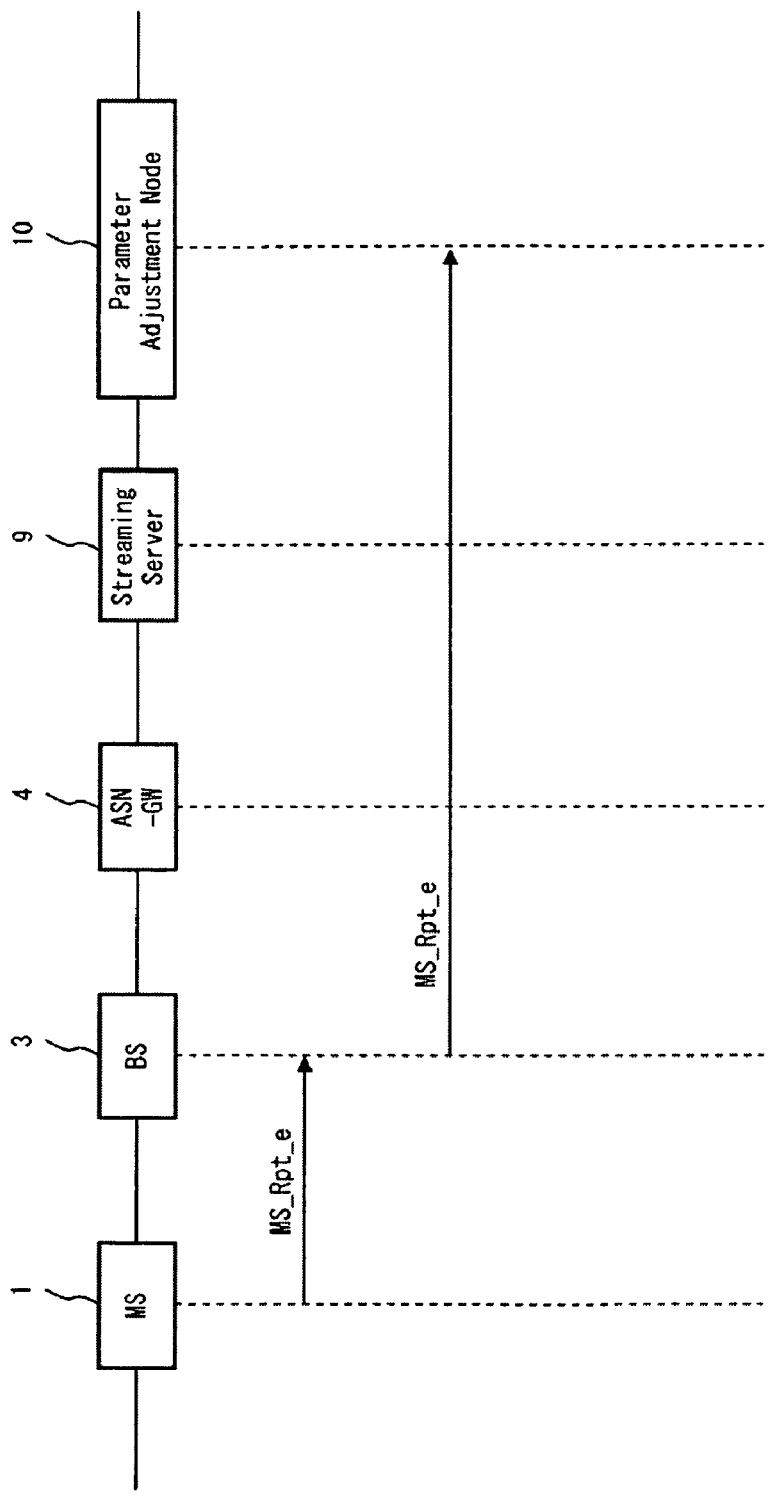
FIG. 30 is a diagram describing the procedures for transmitting the reception state from the mobile station to the parameter adjustment node by the feedback at the IEEE802.16e level.

FIG. 30 is a diagram describing the procedures for transmitting the reception state from the mobile station 1 to the parameter adjustment node 10 by the feedback at the IEEE802.16e level. In this case, the reception state notification unit in the mobile station 1 transmits an MS_Rpt_e message to the base station 3. The MS_Rpt_e message includes data reception states such as the MAC frame rate, HARQ block rate, contents ID, MCBCS zone ID 22 and so on. Other parts of the message configuration are similar to the MS_Rpt_apl message illustrated in FIG. 10. The transmission of the MS_Rpt_e message may be configured to be carried out regularly at given time intervals.

Figure 31:
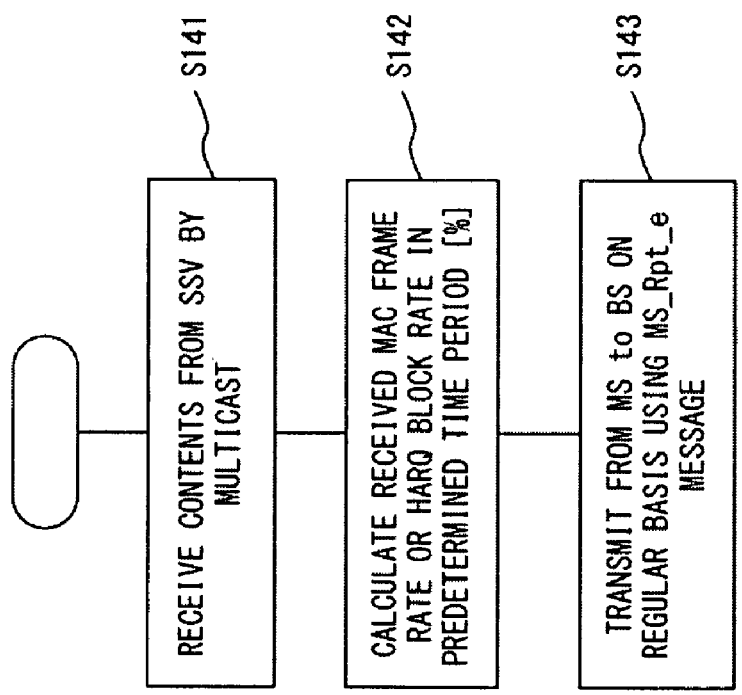
FIG. 31 is a flowchart of operations of the mobile station in performing the transmission of the MS_Rpt_e message.

FIG. 31 is a flowchart of operations of the mobile station 1 in performing the transmission of the MS_Rpt_e message. The mobile station 1 receives the contents distributed from the streaming server 9 by the multicast distribution (step S141). Next, the data reception state calculation unit calculates the MAC frame rate or the HARQ block rate at which the mobile station 1 succeeded in the reception, in a predetermined time period. (step S142). The reception state notification unit incorporates the reception state calculated by the data reception state calculation unit into the MS_Rpt_e message, and transmit it to the base station 3 by the unicast communication (step S143).

Figure 32:
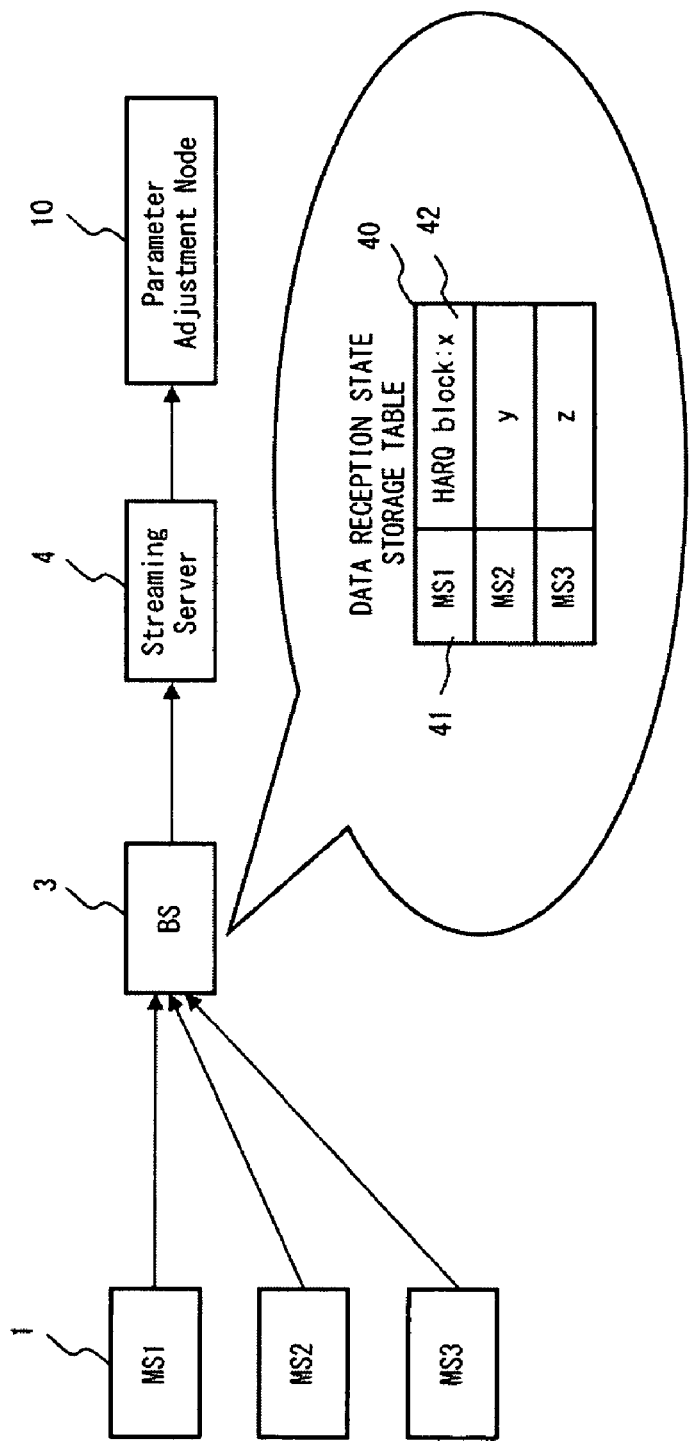
FIG. 32 is a diagram describing the procedures in which the reception state is transmitted to the parameter adjustment node by the feedback at the IEEE802.16e level.

Upon receiving the MS_Rpt_e message, the base station 3 temporarily stores the contents of the message, and transmits the data to the parameter adjustment node 10 on a regular basis. FIG. 32 is a diagram describing the procedures in which the reception state is transmitted to the parameter adjustment node 10 by the feedback at the IEEE802.16e level. The base station 3 includes a data reception state storage table 40 for temporarily storing the reception state reported from the mobile station 1. The data reception state storage table 40 stores a mobile station ID 41 and an HARQ block rate 42. The data reception state storage table 40 may also be configured, in accordance with the configuration of the message transmitted from the mobile station 1, to store the MAC frame rate.

Other Notes

In the embodiments described above, the adjustment threshold value ya was explained as being higher than the distribution target value y. However, the threshold value ya does not have to be a greater value than the distribution target value y. The magnitude relation between the adjustment threshold value ya and the distribution target value y and the difference between these values may be changed in various ways, in accordance with the system configuration and so on.

Any of the embodiments can be realized by a system that includes a plurality of ASN gateways 4 and the base stations 3. The numbers in brackets (1) and the like attached to the arrows in FIGS. 16, 22 and 26 correspond to the numbers in the sequence diagrams illustrated as FIGS. 17, 23 and 27, and the references in the descriptions of each embodiment. The same applies to the numbers in brackets in FIG. 24. Therefore, it does not mean that the procedure having the same number in an embodiment is performed by a plurality of nodes at the same time. For example, the transmission of the Config_Change_Rsp message from the base station 3 to the parameter adjustment node 10 in FIG. 16 is illustrated with (6) for both of the message transmission from the base station 3a and the message transmission from the base station 3b. However, the numbering does not mean that the Config_Change_Rsp message is sent from all of the base stations 3 simultaneously. In addition, while embodiment (2) and the like mentioned a simultaneous transmission of Config_Change_Req message, the message is not necessarily transmitted to a plurality of nodes simultaneously, and there may occur a time difference, depending on the embodiment.

As mentioned above, in the present system, a parameter adjustment setting apparatus (parameter adjustment node) is introduced in a system performing multicast distribution from a server such as a streaming server to a mobile station via a relay node such as a base station and an ASN gateway. The parameter adjustment setting apparatus analyzes the data reception state of the mobile station, and calculates setting change parameters for the relay node and the server so as to make the data reception state fall within a target range. When the information distribution apparatus can be set to the calculated setting-change parameter for the information distribution apparatus, the relay node performs setting change to the setting-change parameter for the relay node.

By adopting the system, the data transmission condition can be changed in accordance with the reception state of the mobile station, to perform multicast distribution efficiently.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A parameter setting change method comprising:
performing multicast distribution of data to a plurality of mobile stations via a relay node, the multicast distribution being performed by an information distribution apparatus;
calculating, performed by the plurality of mobile stations, a data reception state;
reporting the data reception state to a parameter adjustment setting apparatus, the reporting being performed by the plurality of mobile stations;
analyzing the data reception state output from the plurality of mobile stations, the analyzing being performed by the parameter adjustment setting apparatus;
calculating, performed by the parameter adjustment setting apparatus, an information-distribution-apparatus setting-change parameter and a relay-node setting-change parameter for making the data reception state within a predetermined range; and
performing setting change to the relay-node setting-change parameter when the information distribution apparatus can be set to the information-distribution-apparatus setting-change parameter, the setting change being performed by the relay node.

2. The parameter setting change method according to claim 1, wherein
the parameter adjustment setting apparatus transmits the information-distribution-apparatus setting-change parameter and the relay-node setting-change parameter to the information distribution apparatus; and
when setting to the information-distribution-apparatus setting-change parameter can be performed, the information distribution apparatus transmits the relay-node setting-change parameter to the relay node.

3. The parameter setting change method according to claim 2, wherein
the parameter adjustment setting apparatus calculates a first-relay-node setting-change parameter used for setting of a first relay node, and a second-relay-node setting-change parameter used for setting of a second relay node that is located between the first relay node and at least one of the plurality of mobile stations;
the parameter adjustment setting apparatus transmits, to the information distribution apparatus, the information-distribution-apparatus setting-change parameter, the first-relay-node setting-change parameter and the second-relay-node setting-change parameter;
when setting to the information-distribution-apparatus setting-change parameter can be performed, the information distribution apparatus transmits the first-relay-node setting-change parameter and the second-relay node setting-change parameter to the first relay node; and when setting to the first-relay-node setting-change parameter can be performed, the first relay node transmits the second-relay-node setting-change parameter to the second relay node.

4. The parameter setting change method according to claim 1, wherein
the parameter adjustment setting apparatus transmits the information-distribution-apparatus setting-change parameter to the information distribution apparatus;
the information distribution apparatus transmits an information-distribution-apparatus setting-change notification to the parameter adjustment setting apparatus after performing setting to the information-distribution-apparatus setting-change parameter; and
the parameter adjustment setting apparatus transmits the relay-node setting-change parameter to the relay node, with a reception of the information-distribution-apparatus setting-change notification as a trigger.

5. The parameter setting change method according to claim 4, wherein
the parameter adjustment setting apparatus calculates a first-relay-node setting-change parameter used for setting of a first relay node, and a second-relay-node setting-change parameter used for setting of a second relay node that is located between the first relay node and at least one of the plurality of mobile stations;
the parameter adjustment setting apparatus transmits the information-distribution-apparatus setting-change parameter to the information distribution apparatus;
the information distribution apparatus transmits an information-distribution-apparatus setting-change notification to the parameter adjustment setting apparatus after performing setting to the information-distribution-apparatus setting-change parameter;
the parameter adjustment setting apparatus transmits the first-relay-node setting-change parameter to the first relay node with a reception of the information-distribution-apparatus setting-change notification as a trigger;
the first relay node transmits a first-relay-node setting-change notification to the parameter adjustment setting apparatus after performing setting to the first-relay-node setting-change parameter; and
the parameter adjustment setting apparatus transmits the second-relay-node setting-change parameter to the second relay node with a reception of the first-relay-node setting-change notification as a trigger.

6. The parameter setting change method according to claim 4, wherein
the parameter adjustment setting apparatus calculates a first-relay-node setting-change parameter used for setting of a first relay node, and a second-relay-node setting-change parameter used for setting of a second relay node that is located between the first relay node and at least one of the plurality of mobile stations;
the parameter adjustment setting apparatus transmits the information-distribution-apparatus setting-change parameter to the information distribution apparatus;
the information distribution apparatus transmits an information-distribution-apparatus setting-change notification to the parameter adjustment setting apparatus after performing setting to the information-distribution-apparatus setting-change parameter;
the parameter adjustment setting apparatus transmits the first-relay-node setting-change parameter and the second-relay-node setting-change parameter to the first relay node with a reception of the information-distribution-apparatus setting-change notification as a trigger; and
when setting to the first-relay-node setting-change parameter can be performed, the first relay node transmits the second-relay-node setting-change parameter to the second relay node.

7. A system comprising:
a plurality of mobile stations;
a relay node;
an information distribution apparatus that performs multicast distribution of data to the plurality of mobile stations via the relay node; and
a parameter adjustment setting apparatus, wherein
the plurality of mobile stations calculate a data reception state;
the plurality of mobile stations report the data reception state to the parameter adjustment setting apparatus;
the parameter adjustment setting apparatus analyzes a data reception state output from the plurality of mobile stations and calculates an information-distribution-apparatus setting-change parameter and a relay-node setting-change parameter for distributing the data from the information distribution apparatus to the plurality of mobile stations; and
when setting to the information-distribution setting-change parameter can be performed in the information distribution apparatus, the relay node performs setting to the relay-node setting-change parameter.

8. A setting apparatus comprising:
a reception state analysis unit analyzing, when multicast distribution is performed from an information distribution apparatus via a relay node, a data reception state of a mobile station located in a communication area of the relay node;
a parameter calculation unit calculating, when the data reception state is not within a predetermined range, an information-distribution-apparatus setting-change parameter that represents a parameter for the information distribution apparatus for making the data reception state within the predetermined range, and a relay-node setting-change parameter that represents a parameter for the relay node for making the data reception state within the predetermined range; and
a parameter setting control unit checking whether the information distribution apparatus and the relay node have been set to the setting-change parameters calculated by the parameter calculation unit.

9. The setting apparatus according to claim 8, wherein
when the information distribution apparatus can be set to the information-distribution-apparatus setting-change parameter, the parameter setting control unit transmits the relay-node setting-change parameter to the relay node.

10. The setting apparatus according to claim 8, wherein
when the parameter setting control unit recognizes a failure in setting the information distribution apparatus to the information-distribution-apparatus setting-change parameter and/or a failure in setting the relay node to the relay-node setting-change parameter, the parameter calculation unit recalculates the information-distribution-apparatus setting-change parameter and the relay-node setting-change parameter.

11. A mobile station comprising:
a data reception state calculation unit to calculate a data reception state at a time when multicast distribution is performed from an information distribution apparatus via a relay node; and
a reception state notification unit to transmit the data reception state calculated by the data reception state calculation unit to a parameter adjustment setting apparatus that calculates an information-distribution-apparatus setting-change parameter and a relay-node setting-change parameter for making the data reception state within a predetermined range.

12. The mobile station according to claim 11, wherein
the data reception state calculation unit calculates a reception state of data that is received using a first connection used for the multicast distribution with the relay node; and
the reception state notification unit performs notification of the data reception state using a second connection for performing unicast communication via the relay node.

13. A node relaying data distributed from an information distribution apparatus to a mobile station by multicast distribution, comprising:
a parameter control unit performing setting to a setting-change parameter transmitted from a parameter adjustment setting apparatus that calculates, when a data reception state of the mobile station is not within a predetermined range, a setting-change parameter for making the reception state within the predetermined range; and
a setting state notification unit transmitting, when setting to the setting-change parameter fails, a setting failure notification for making the parameter adjustment setting apparatus recalculate the setting-change parameter.

14. The node according to claim 13 relaying the data distributed by the multicast to the mobile station via an other relay node, wherein
when the setting-change parameter and an other setting-change parameter used for setting of the other relay node are transmitted from the parameter adjustment setting apparatus and setting to the setting-change parameter can be performed, the relay node transmits the other setting-change parameter to the other relay node.

* * * * *